(12) United States Patent
Spezie et al.

(10) Patent No.: US 11,990,733 B2
(45) Date of Patent: May 21, 2024

(54) COMPACT ELECTRIC SWITCHING SUBSTATION INTO A LATTICE TOWER FOR CONNECTION OF ACTIVE AND PASSIVE USERS TO A HIGH-VOLTAGE ELECTRIC GRID AND USE OF SAID SUBSTATION FOR CONNECTING AN ELECTRIC VEHICLE CHARGING STATION TO A HIGH-VOLTAGE ELECTRIC GRID

(71) Applicant: TERNA S.P.A., Rome (IT)

(72) Inventors: Roberto Spezie, Rome (IT); Evaristo Di Bartolomeo, Rome (IT); Andrea Valant, Rome (IT); Dario Polinelli, Rome (IT); Massimo Petrini, Rome (IT); Enrico Di Vito, Rome (IT); Francesco Palone, Rome (IT); Claudio Angelo Serafino, Rome (IT)

(73) Assignee: Terna S.P.A., Rome (IT)

( * ) Notice: Subject to any disclaimer, the term of this patent is extended or adjusted under 35 U.S.C. 154(b) by 111 days.

(21) Appl. No.: 17/788,241

(22) PCT Filed: Dec. 23, 2020

(86) PCT No.: PCT/IB2020/062411
§ 371 (c)(1),
(2) Date: Jun. 22, 2022

(87) PCT Pub. No.: WO2021/130704
PCT Pub. Date: Jul. 1, 2021

(65) Prior Publication Data
US 2023/0048351 A1    Feb. 16, 2023

(30) Foreign Application Priority Data

Dec. 23, 2019  (IT) .......................... 102019000025417
Jun. 12, 2020  (EP) ...................................... 20179821

(51) Int. Cl.
H02B 5/06    (2006.01)
H02B 5/02    (2006.01)

(52) U.S. Cl.
CPC ................. *H02B 5/06* (2013.01); *H02B 5/02* (2013.01)

(58) Field of Classification Search
CPC ............... H02B 5/00; H02B 5/02; H02B 5/06
See application file for complete search history.

(56) References Cited

U.S. PATENT DOCUMENTS 2,689,888 A * 9/1954 Viboud .................... H02B 5/02
                                                              218/43
3,732,374 A * 5/1973 Rocher ................. H04M 9/025
                                                              370/442
(Continued)

FOREIGN PATENT DOCUMENTS

CN    108631311 A  * 10/2018   ............. H92H 9/041
CN    207988628 U  * 10/2018
(Continued)

OTHER PUBLICATIONS

PCT International Search Report and Written Opinion dated Apr. 22, 2021 for PCT Application No. PCT/IB2020/062411.
PCT/IB2020/062411, filed Dec. 23, 2020, WO 2021/130704 A1.

*Primary Examiner* — Robert J Hoffberg
(74) *Attorney, Agent, or Firm* — McCarter & English, LLP

(57) ABSTRACT

A lattice tower for high-voltage overhead transmission lines having a lattice structure is provided that includes: a base anchored to the ground; a top portion designed for anchoring first and second conductors of a high-voltage overhead transmission line; and a body which extends between the base and the top portion. The lattice tower includes a grid high-voltage electric switching substation that includes: GIS-technology-based switchgear equipment arranged (Continued)

within the base of the lattice structure; a first loop-in loop-out feeder connection configured to connect the first conductors of the high-voltage overhead transmission line to the GIS-technology-based switchgear equipment; a second loop-in loop-out feeder connection configured to connect the second conductors of the high-voltage overhead transmission line to the GIS-technology-based switchgear equipment; and a protection, command and control system arranged within the lattice structure, or in proximity to the base of said lattice structure.

16 Claims, 14 Drawing Sheets

(56) References Cited

U.S. PATENT DOCUMENTS

| | | | |
|---|---|---|---|
| 7,193,338 B2* | 3/2007 | Ghali | H02B 5/00 |
| | | | 361/62 |
| 10,097,037 B2* | 10/2018 | Inam | H02J 13/00022 |
| 10,218,175 B2* | 2/2019 | Inam | H02J 3/00 |
| 10,559,975 B2* | 2/2020 | Inam | H02J 13/00002 |
| 10,749,341 B2* | 8/2020 | Inam | H02J 13/00002 |
| 11,594,887 B2* | 2/2023 | Inam | H02J 13/00034 |
| 11,799,274 B2* | 10/2023 | Cameroni | H02B 5/06 |
| 2020/0287595 A1* | 9/2020 | Bowler | H01P 5/08 |
| 2023/0048351 A1* | 2/2023 | Spezie | H02B 5/06 |
| 2023/0361541 A1* | 11/2023 | Di Bartolomeo | H02B 13/065 |

FOREIGN PATENT DOCUMENTS

| | | | | |
|---|---|---|---|---|
| CN | 113009662 A | * | 6/2021 | G02B 6/4446 |
| WO | WO-2021074812 A1 | * | 4/2021 | H02B 5/02 |

* cited by examiner

COMPACT ELECTRIC SWITCHING SUBSTATION INTO A LATTICE TOWER FOR CONNECTION OF ACTIVE AND PASSIVE USERS TO A HIGH-VOLTAGE ELECTRIC GRID AND USE OF SAID SUBSTATION FOR CONNECTING AN ELECTRIC VEHICLE CHARGING STATION TO A HIGH-VOLTAGE ELECTRIC GRID

CROSS-REFERENCE TO RELATED APPLICATIONS

This patent application is a 35 U.S.C. § 371 National Stage filing of International Application No. PCT/IB2020/062411, filed on Dec. 23, 2020, which claims priority from Italian patent application no. 102019000025417 filed on Dec. 23, 2019, and European patent application no. 20179821.2 filed on Jun. 12, 2020, the entire disclosures of which are incorporated herein by reference.

TECHNICAL FIELD OF THE INVENTION

The present invention relates to an innovative solution enabling, in general, the connection of active and passive users to a high-voltage electric line and, in particular, the integration of an extremely-compact electric switching substation into a High-Voltage (HV) lattice tower.

Furthermore, the present invention also concerns the use of said electric switching substation for solving the problem of power supply of electric vehicle charging stations (and, more specifically, of stations for fast charging of electric vehicles), through a "loop-in loop-out" connection to a HV overhead electric line, thus creating a highly sustainable and extremely effective solution for charging electric vehicles.

STATE OF THE ART

The Applicant, as operator of a High-Voltage (HV) electric grid, is obliged to guarantee the connection of all the HV users that demand it and to get ready to guarantee the connection of new types of users to the grid, also including electric vehicle charging stations (charging users).

As is known, nowadays, the best solution for the connection to the HV electric grid, through an existing HV line, of user demanding it, consists in creating a "loop-in loop-out" connection, which means the interruption of the existing line and the insertion, at the new line terminals thus formed, of a new grid HV electric switching substation, pertaining to the grid operator, to which the user connects with its own user HV electric substation. In this way, the new grid HV electric switching substation for the connection of the user will be connected to the grid through two distinct lines, each made up of one of the two sections into which the existing line has been divided and, in general, of a new feeder connection of such sections to the grid HV electric switching substation. In the "loop-in loop-out" insertion, the two feeder connections will be preferably made up of two separate feeder lines, made at a distance such that to enable maintenance on a line with the other one live, thus limiting the number of power interruptions for the user.

In this connection, FIGS. 1A and 1B schematically illustrate a typical embodiment of a "loop-in loop-out" type solution for the connection of a user HV electric substation to an existing HV overhead electric line.

In particular, FIG. 1A illustrates a portion of an existing transmission line 10 that comprises a first lattice tower 11, a second lattice tower 12, a third lattice tower 13 and a fourth lattice tower 14, which support the overhead conductors of an HV electric line.

Specifically, the scenario shown in FIG. 1A represents the situation prior to the connection of a new HV user, wherein the overhead conductors are supported by four lattice towers 11, 12, 13, 14 with continuity.

Instead, FIG. 1B illustrates the situation resulting from the connection of a new user 20 (e.g. a passive user, such as an industrial system, or an active user, such as a photovoltaic plant) to the existing HV transmission line 10, wherein:

a grid HV electric switching substation 15 is connected to the transmission line 10 between the second lattice tower 12 and the third lattice tower 13 with a "loop-in loop-out" type solution, thereby being the grid system for the connection; and a user HV electric substation 21, pertaining to the user 20, is connected, with a radial connection, to the grid HV electric switching substation 15, thereby being the user system for the connection.

Furthermore, FIGS. 1A and 1B also show the servitude strip of the transmission line 10 by means of two broken lines.

The creation of a connection of a new user to the HV grid, through a "loop-in loop-out" solution of the aforesaid type typically takes a very long time (in particular, in an Italian context it can take up to 38 months in total, of which about 15-20 months for obtaining the various environmental authorizations as well as the authorization to construct and operate and about 12-18 months for the construction).

Furthermore, a traditional grid HV electric switching substation for the "loop-in loop-out" connection of a new user to the HV grid (such as, for example, the grid HV electric switching substation 15 of FIG. 1B) can end up occupying a large area of land, specifically an area of about:

90 m×60 m≈5400 $m^2$, in the event of a double bus bar grid HV electric switching substation; or 70 m×45 m≈3200 $m^2$, in the event of a single bus bar grid HV electric switching substation.

Known solutions for creating GIS-technology-based switchgear equipment (i.e. "Gas-Insulated Substation") installed at the lattice towers are described in JP S58 22806 U and in JP S51 38419 B1. However, such solutions are not compact, as they require the occupation of large volumes and extensive areas of land around the lattice towers.

Furthermore, RU 2 420 846 C1 describes a High to Low Voltage (HV/LV) power transformer substation not using GIS technology wherein all the elements are integrated within the base of a steel support of an overhead power line.

Furthermore, as previously explained, the Applicant, as the manager of an HV electric grid, is obliged to guarantee the connection of all the HV users who demand it, including new types of users, such as charging stations for electric vehicles (charging users).

As is known, electric vehicle charging stations can cause huge power absorptions, concentrated in restricted time slots of the day, introducing the risk of congestion on the Medium Voltage (MV) distribution grids and making it difficult to comply with the technical standards on the management thereof. Furthermore, in the current state, an increase in absorption can be predicted for future charging stations due to the increase in the number of charging points within the same charging station and the installation of battery chargers (charging points) with higher power, functional to the reduction of charging times (fast charging). The increase in power absorbed by the charging stations will, thence, make it necessary to connect to the HV power grid.

Furthermore, the connection of the charging stations of electric vehicles to the HV grids will be promoted by the respective operators for enabling flexible services that aim to facilitate the management of the grids.

On this point, a known solution for creating charging stations for electric vehicles is described in WO 2019/123424 A1, which concerns a solution for supplying charging stations for electric vehicles, in which the power supply is obtained through a tap from the conductors of a span of a three-phase High-Voltage (HV) or Extra-High-Voltage (EHV) overhead power line.

More specifically, WO 2019/123424 A1 concerns a charging station for electric vehicles for the connection to a span of an overhead HV or EHV transmission line, which includes:
- a tap for the connection to the span of an overhead transmission line;
- an electric station powered by said tap comprising one or more power transformers for transforming the HV or EHV into LV for supplying battery chargers of electric vehicles, without the need for a Medium Voltage (MV) distribution grid; and
- one or more battery chargers for electric vehicles powered by said electric station.

The tap includes HV or EHV equipment and the disconnecting and automation equipment used for connecting the power transformers of the electric station to the three-phase HV or EHV overhead power line.

In the solution according to WO 2019/123424 A1, the HV tap implemented is a rigid tap performed without the use of switching devices interposed on the HV transmission backbone.

Such a tap implies the following significant disadvantages:
1) in the event of maintenance on one of the two sections of the overhead line, manual intervention is required, at the tap (work at height), for disconnecting the charging station, subject to power interruption of the entire HV backbone and, therefore, of the charging station;
2) alternatively, so as not to have a power interruption on the charging station, intervention is required on the overhead line during operation and when live (so-called "live-line work"); such type of intervention is conditioned by the simultaneous presence of the following requirements that make it rarely feasible:
   favourable atmospheric conditions,
   appropriate grid arrangement and appropriate setting of protective logics,
   availability of personnel qualified to do "live-line work";
3) in the event of a fault on one of the two sections of the overhead line, the absence of protections and switching devices at the tap, implies the loss of power supply to the charging station and the need for manual intervention for the identification of the fault and the operations to make it safe;
4) in the event of a fault in the charging station, the entire overhead line is out of order, causing problems for any HV users connected to the backbone, and possible critical issues in the safe operation of portions of HV grid;
5) the connection to the HV overhead line and the disconnection therefrom of the charging station causes the entire HV backbone to be out of order and the disconnection of the users, as well as a possible reduction in security for the portion of HV grid in which the backbone is inserted.

OBJECT AND SUMMARY OF THE INVENTION

In view of what previously explained, the Applicant has felt the need to conduct an in-depth research to develop a solution that can overcome, or at least relieve, the environmental issues connected with "loop-in loop-out" type solutions currently known for the High-Voltage (HV) connection of a user to an HV electric line, thereby achieving the present invention.

Therefore, a first object of the present invention is that of providing a solution of the "loop-in loop-out" type for the connection of a user substation to an existing HV overhead power line that is characterized by reduced land consumption with respect to the solutions currently known and that, thanks to such characteristic, enables authorization and construction times to be reduced.

Furthermore, a second object of the present invention is that of providing an innovative technical solution that:
- provides a suitable response to a potential rapid growth in demand for connection to the HV grid by passive and active users, guaranteeing certain authorization times for the construction and operation, as well as the implementation of various connections;
- complies with the rules for connection to HV grids, to guarantee reliability and security during the operation of the existing power system; and
- is sustainable, from the point of view of environmental inclusion, guaranteeing reduced land consumption.

Therefore, a third object of the present invention is that of providing an innovative technical solution that can overcome, or at least relieve, the technical problems of currently used solutions for connecting charging stations of electric vehicles to HV grids.

Finally, a fourth object of the present invention is that of providing a highly sustainable and extremely effective solution for creating a "loop-in loop-out" connection of charging stations of electric vehicles (and, more specifically, of stations for the fast charging of electric vehicles) to an HV overhead power line.

These and other objects are achieved by the present invention in that it relates to a lattice tower for high-voltage overhead transmission lines, according to what is defined in the appended claims.

In particular, the lattice tower according to the present invention has a lattice structure that includes:
- a base anchored to the ground;
- a top portion designed for anchoring first and second conductors of a high-voltage overhead transmission line; and
- a body which extends between the base and the top portion.

Said lattice tower comprises a grid high-voltage electric switching substation which includes:
- GIS-technology-based switchgear equipment (i.e., Gas-Insulated Substation) which is arranged within the base of the lattice structure;
- a first loop-in loop-out feeder connection that is configured to connect the first conductors of the high-voltage overhead transmission line to the GIS-technology-based switchgear equipment, and made by insulated cables or GIS-technology-based ducts, or by mixed solutions wherein a first portion is made by bare conductors and a second portion is made by insulated cables or GIS-technology-based ducts;
- a second loop-in loop-out feeder connection that is configured to connect the second conductors of the high-voltage overhead transmission line to the GIS-technology-based switchgear equipment, and made by insulated cables or GIS-technology-based ducts, or by mixed solutions wherein a first portion is made by bare conductors and a second portion is made by insulated cables or GIS-technology-based ducts; and a protection, command and control system (PCCS) arranged within the lattice structure, or in proximity to the base of said lattice structure;

wherein the GIS-technology-based switchgear equipment is also designed to be connected to a user connection line. Additionally, the present invention also concerns:

a group for charging electric vehicles that includes
said lattice tower and
a user substation for supplying an electric vehicle charging user connected to the GIS-technology-based switchgear equipment through said user connection line; and the use of said grid high-voltage electric switching substation integrated into said lattice tower for connecting a user substation for supplying an electric vehicle charging user to a high-voltage overhead transmission line.

BRIEF DESCRIPTION OF THE DRAWINGS

For a better understanding of the present invention, some preferred embodiments, provided purely by way of non-limiting example, shall now be illustrated with reference to the appended drawings (not in scale), wherein.

DETAILED DESCRIPTION OF PREFERRED EMBODIMENTS OF THE INVENTION

The following description is provided to enable a person skilled in the art to implement and use the invention. Various modifications to the embodiments presented shall be immediately clear to persons skilled in the art and the general principles disclosed herein could be applied to other embodiments and applications but without thereby departing from the scope of protection of the present invention as defined in the appended claims.

In other words, the present invention should not be understood as limited to the sole embodiments described and shown, but it must be given the widest scope of protection according to the characteristics defined in the appended claims.

The present invention comes from the idea of the Applicant to replace the typical so-called "triangular configuration" type of lattice towers traditionally used in the Italian territory for 132-150 kV transmission lines, with a "delta-shaped" lattice tower, adapted to take in, simply and in compliance with the air isolation clearances, High-Voltage (HV) droppers from the line conductors, for an innovative "loop-in loop-out" connection, to be implemented with "Gas-Insulated Substation" (GIS) technology-based switchgear equipment arranged within the volume of the lattice structure of the "delta-shaped" tower appropriately modified in its base and top hamper structure. Furthermore, still within the volume of the structure of the "delta-shaped" lattice tower, a protection, command and control system (PCCS) is arranged, housed within one or more shelters. In this way a diagram is obtained which can guarantee high operating flexibility, that can be further increased by introducing, on the tower itself, further switching equipment with the function of bypassing the "loop-in loop-out" connection, also arranged within the lattice structure.

Figure 2A:
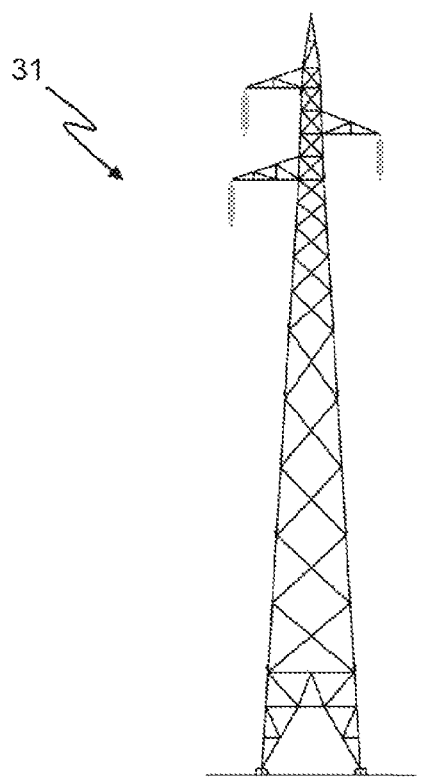
FIGS. 2A and 2B schematically illustrate two lattice towers of the known type and, respectively, a suspension tower of the "triangular configuration" type and a "delta-shaped" tension tower.
Figure 2B:
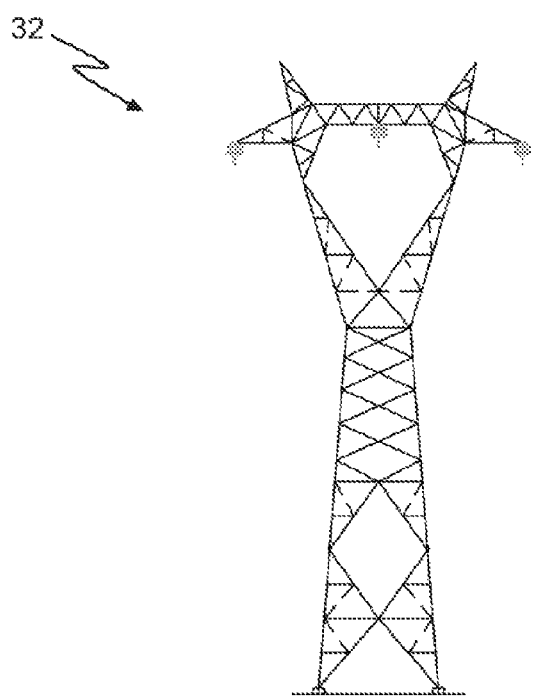

For a better understanding of what has just been explained, FIGS. 2A and 2B show, by way of example, a typical "triangular configuration" lattice 31 and a typical "delta-shaped" lattice 32 of the known type.

Figure 3A:
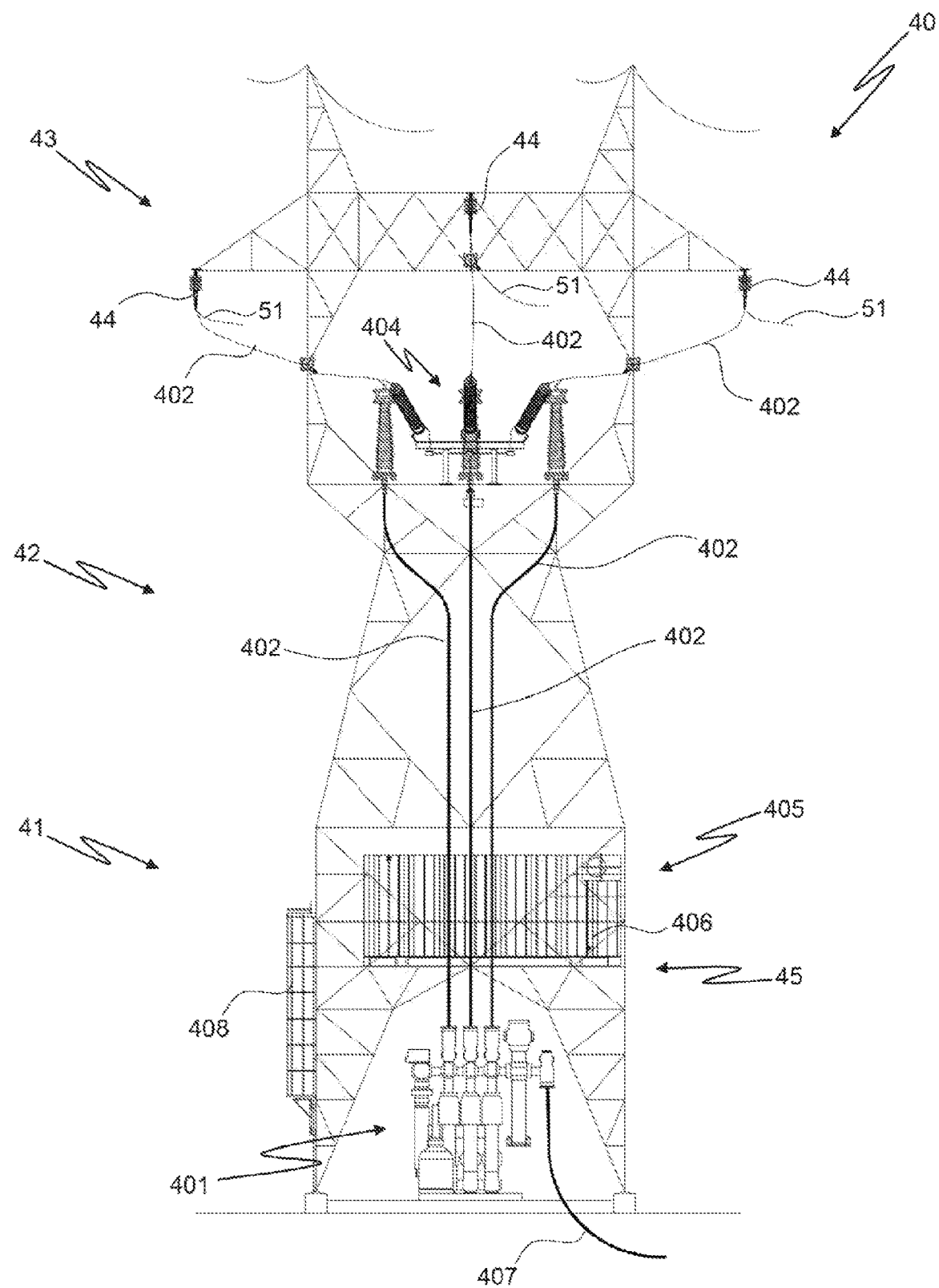
FIGS. 3A and 3B schematically illustrate a "delta-shaped" lattice tower, appropriately modified in its general structure (base and "top hamper"), into which a grid HV electric switching substation is integrated, in compact form, according to a preferred embodiment of the present invention, also comprising the installation of bypass switching equipment at the top hamper, whereas FIG. 3C schematically illustrates a protection, command and control system also housed within the lattice tower of FIGS. 3A and 3B.
Figure 3B:
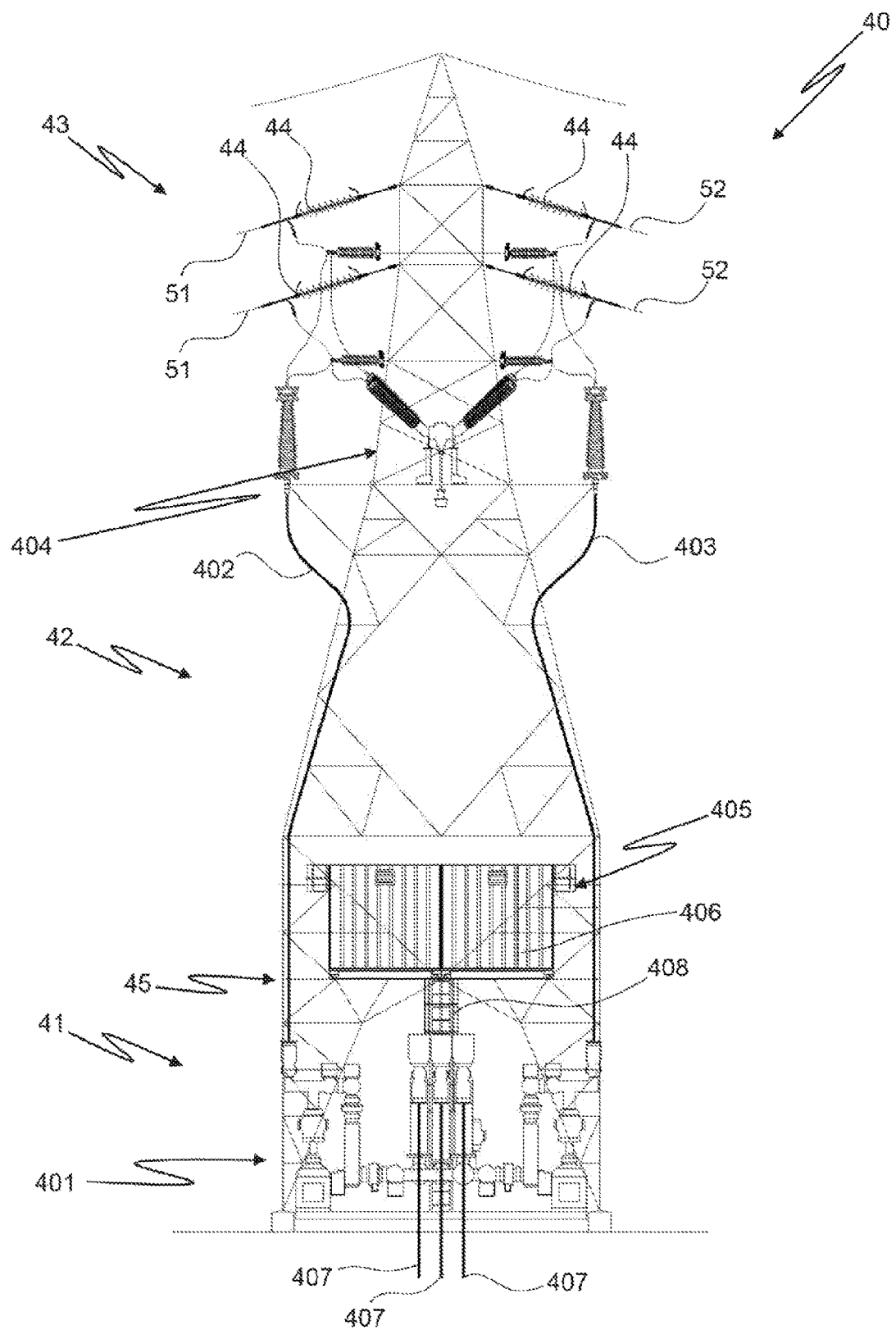

Instead, FIGS. 3A and 3B schematically illustrate a lattice tower 40 according to a preferred embodiment of the present invention. In particular, FIG. 3A is a front schematic view of the lattice tower 40, whereas FIG. 3B is a lateral schematic view of said lattice tower 40.

In detail, the lattice tower 40 has a lattice structure (i.e. of the grid type) which includes three main portions, i.e.:

a base 41 anchored to the ground (and, preferably, having a substantially rectangular parallelepiped shape);

a body (or trunk) 42 that extends vertically from the base 41 and which is tapered upwards (preferably, having a substantially straight pyramid trunk shape); and a top portion 43 (so-called "top hamper") of the "delta-shaped" type arranged above the body 42 and to which first conductors 51 (in particular, at a front part of the lattice structure) and second conductors 52 (in particular, at a rear part of the lattice structure) of a HV overhead power line (conveniently, a three-phase line) are anchored (conveniently, by means of chains of insulators 44).

Furthermore, the lattice tower 40 also comprises a grid HV electric switching Substation which is integrated into the lattice structure of said lattice tower 40 and which includes:

GIS-technology-based switchgear equipment 401 (i.e. with components insulated in gas under pressure having the function of being an electric insulating fluid), which is arranged within the base 41, comprises three bays and can conveniently create an electric switching configuration according to a "Y", or "ring" shaped diagram;

a first "loop-in loop-out" feeder connection 402 that
  connects the first conductors 51 of the HV overhead transmission line to the GIS-technology-based switchgear equipment 401 and
  can be suitably made by insulated cables or GIS-technology-based ducts, or by mixed solutions in which a first portion is made by bare conductors and a second portion is made by insulated cables or GIS-technology-based ducts (e.g. as illustrated in FIGS. 3A and 3B, wherein the first "loop-in loop-out" feeder connection 402 comprises a respective first portion made by bare conductors and a respective second portion made by insulated cables);

a second loop-in loop-out feeder connection 403 that
  connects the second conductors 52 of the HV overhead transmission line to the GIS-technology-based switchgear equipment 401 and
  can be suitably made by insulated cables or GIS-technology-based ducts, or by mixed solutions in which a first portion is made by bare conductors and a second portion is made by insulated cables or GIS-technology-based ducts (e.g. as illustrated in FIGS. 3A and 3B, wherein the second "loop-in loop-out" feeder connection 403 also comprises a respective first portion made by bare conductors and a respective second portion made by insulated cables);

a third connection achieving a user connection line 407 (e.g. by means of a buried cable HV line) to the GIS-technology-based switchgear equipment 401; and a protection, command and control system (PCCS) 405 which is arranged within one or more shelters 406 and is arranged within the base 41 above the GIS-technology-based switchgear equipment 401 (in particular, in a raised position 45 with respect to the latter).

The grid HV electric switching substation can further conveniently include bypass switching equipment 404 (e.g. made by means of a disconnector or a switch disconnector) which is:

integrated into the top portion 43 of the lattice tower 40;
connected between the first and the second "loop-in loop-out" feeder connections 402, 403 (in particular, as illustrated in the example shown in FIGS. 3A and 3B, the bypass switching equipment 404 is conveniently interposed between
  the respective first portion of each "loop-in loop-out" feeder connection 402, 403 made by bare conductors and
  the respective second portion of each "loop-in loop-out" feeder connection 402, 403 made by insulated cables);

configured to maintain, by default, said first and second "loop-in loop-out" feeder connections 402, 403 not directly connected to one another, so as to maintain a "loop-in loop-out" connection between the first and second conductors 51, 52 of the HV overhead transmission line through the GIS-technology-based switchgear equipment 401; and operable, when necessary, to directly connect said first and second "loop-in loop-out" feeder connections 402, 403 so as to obtain a direct connection between the first and second conductors 51, 52 of the HV overhead transmission line bypassing the GIS-technology-based switchgear equipment 401.

The first "loop-in loop-out" feeder connection 402 extends from the top portion 43 to the base 41 substantially along the front part of the lattice structure. Likewise, the second "loop-in loop-out" feeder connection 403 extends from the top portion 43 to the base 41 substantially along the rear part of the lattice structure.

On the other hand, the user connection line 407 is connected to the GIS-technology-based switchgear equipment 401 at a side part of the lattice structure.

Preferably, the protection, command and control system (PCCS) 405 includes GIS control cabinets, auxiliary systems (AS), general systems (GS), command, control and monitoring cabinets and panels, and telecommunication systems/modules.

Conveniently, said PCCS 405 can be made accessible by means of a ladder 408 preferably installed on an outer side of the base 41 of the lattice tower 40. Furthermore, said base 41 could be conveniently closed/protected by means of external barriers and/or gates (not shown in FIGS. 3A and 3B for illustration simplicity) in order to enable access to authorized personnel only.

Conveniently, the positioning of the shelter(s) 406 containing said PCCS 405 at height (i.e. in a raised position with respect to the GIS-technology-based switchgear equipment 401) can take place during the construction of the lattice tower 40.

Figure 3C:
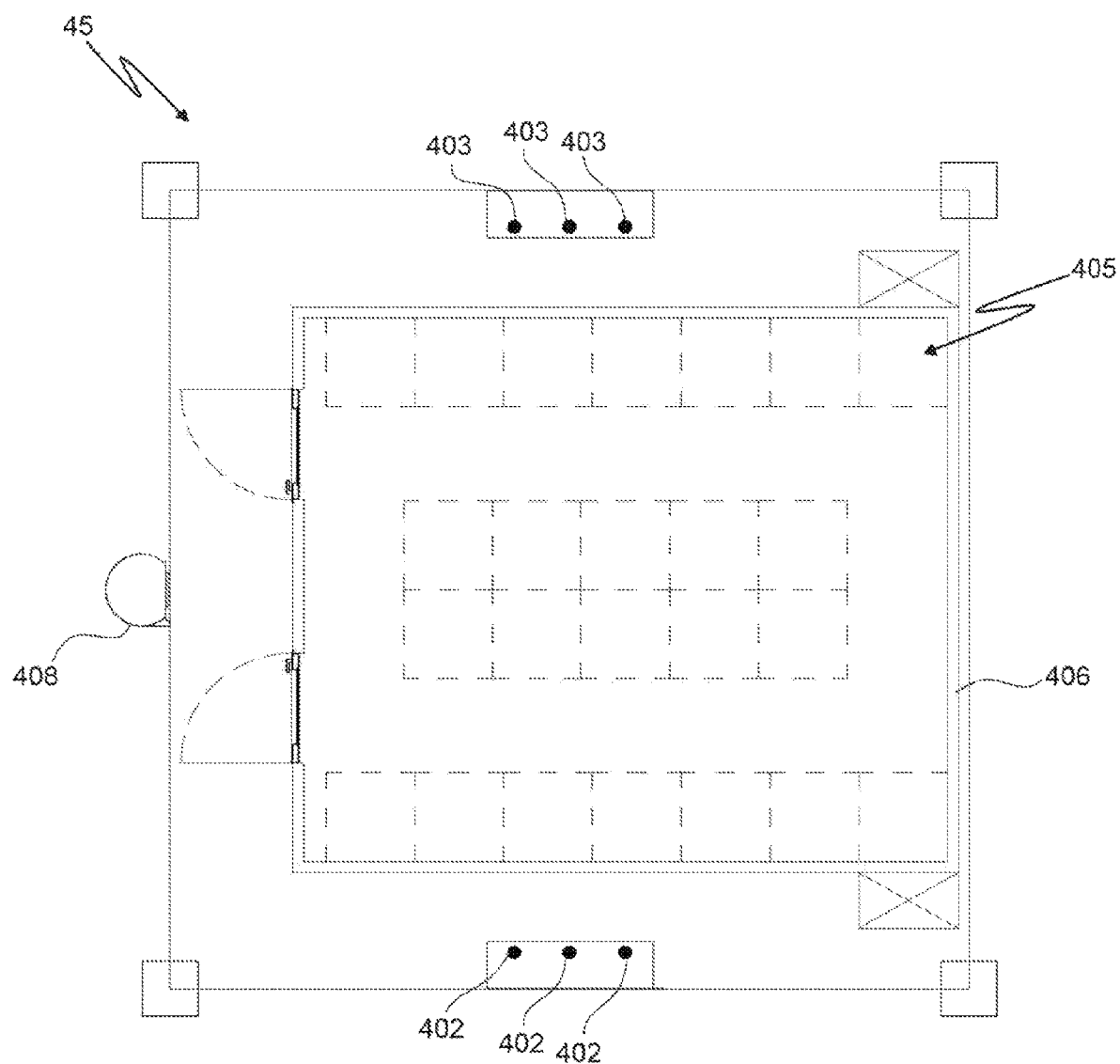

On this point, FIG. 3C schematically illustrates the positioning of the shelter(s) 406 containing the PCCS 405 on a plane 45 of the base 41 which is arranged in a raised position with respect to the GIS-technology-based switchgear equipment 401 and is accessible by means of the ladder 408. In particular, FIG. 3C shows a plan view of a qualitative section of said shelter(s) 406 and said PCCS 405.

It is important to note that, according to an alternative embodiment, the PCCS 405, i.e. the shelter(s) 406 containing said PCCS 405, could be conveniently arranged also outside the base 41 (more precisely, it/they could be conveniently arranged on the ground, next to the base 41, in any case within the servitude strip of the transmission line).

Preferably, the GIS-technology-based switchgear equipment 401 is extractably housed (i.e. so as to be easily inserted and extracted) within the base 41 of the lattice tower 40 in order to facilitate commissioning and extraordinary maintenance operations. For example, the GIS-technology-based switchgear equipment 401 could be conveniently mounted on constrained-guide insertion/extraction systems (not shown in FIGS. 3A and 3B for illustration simplicity—e.g. based on runways or rails), such as to enable:

the insertion of said GIS-technology-based switchgear equipment 401 within the base 41 during commissioning;

the extraction of said GIS-technology-based switchgear equipment 401 from the base 41 in order to enable the performance of extraordinary maintenance interventions simply and quickly; and the re-insertion of said GIS-technology-based switchgear equipment 401 within the base 41, once the interventions have been completed.

In this way, interventions of authorized personnel on the GIS-technology-based switchgear equipment 401 are facilitated as the technicians, as well as being able to work on the ground, also manage to have plenty of space available, in particular for performing extraordinary maintenance operations.

Furthermore, for the maintenance operations, one or more lifting hoists/cranes can be conveniently provided within the base 41 (not shown in FIGS. 3A and 3B for illustration simplicity) to facilitate the disassembly and assembly of some elements/components of the GIS-technology-based switchgear equipment 401.

Figure 4A:
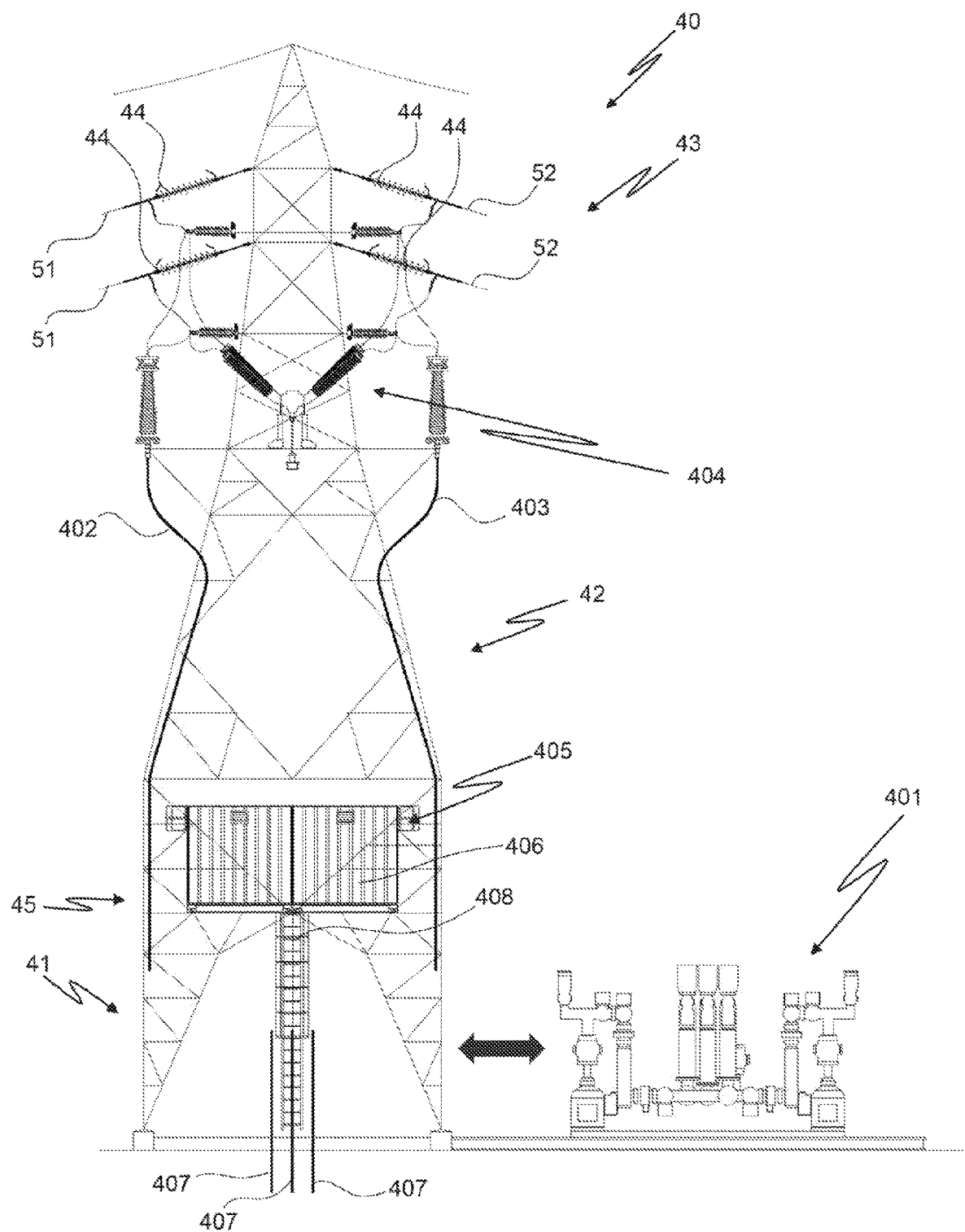
FIGS. 4A and 4B schematically illustrate a construction/maintenance intervention mode, with displacement of GIS-technology-based switchgear equipment arranged within the base of the lattice tower of FIGS. 3A and 3B.
Figure 4B:
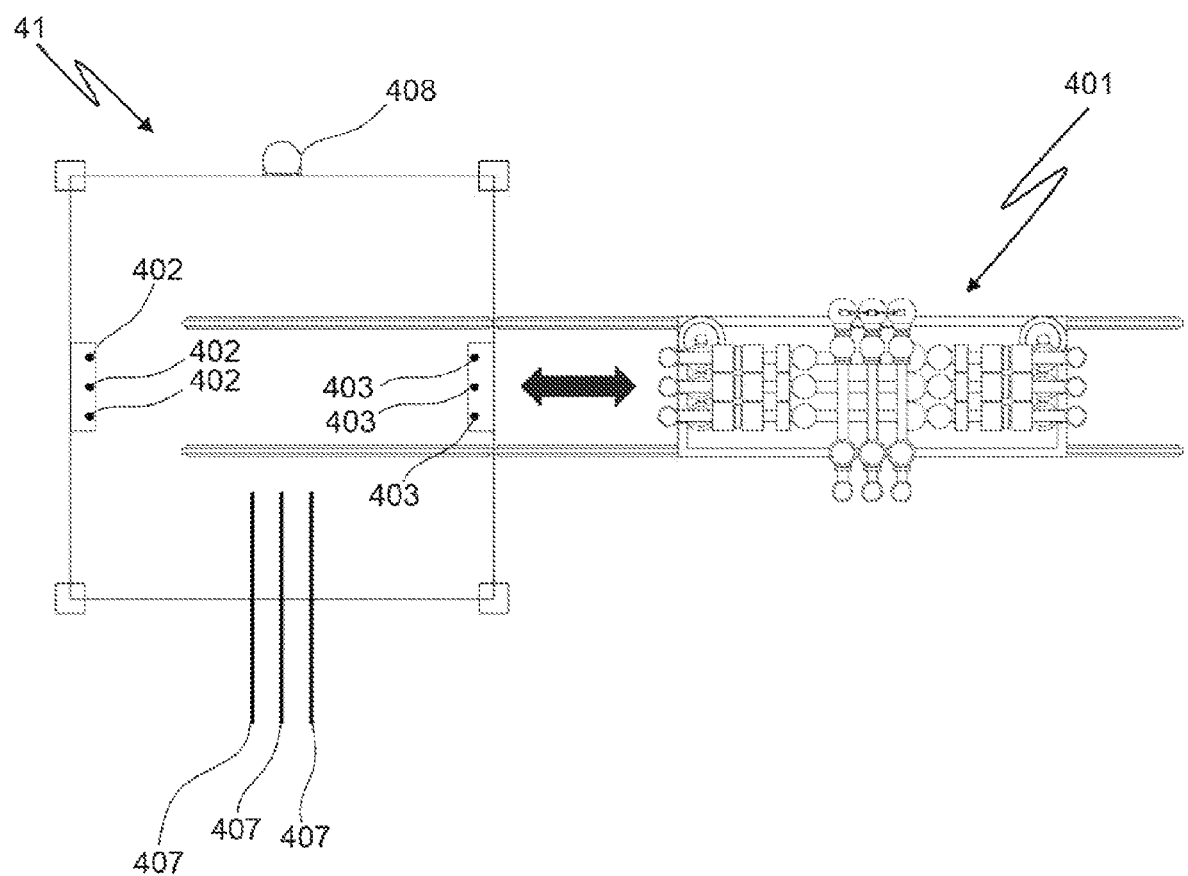

For a better understanding of what has just been described, FIGS. 4A and 4B schematically illustrate an example of the extraction of GIS-technology-based switchgear equipment 401 from the base 41 of the lattice tower 40. In particular, FIG. 4A is a schematic lateral view of said lattice tower 40, whereas FIG. 4B is a schematic plan view, in which the GIS-technology-based switchgear equipment 401 is shown after the extraction from the base 41, by means of both fixed and removable constrained-guide extraction systems.

Figure 5A:
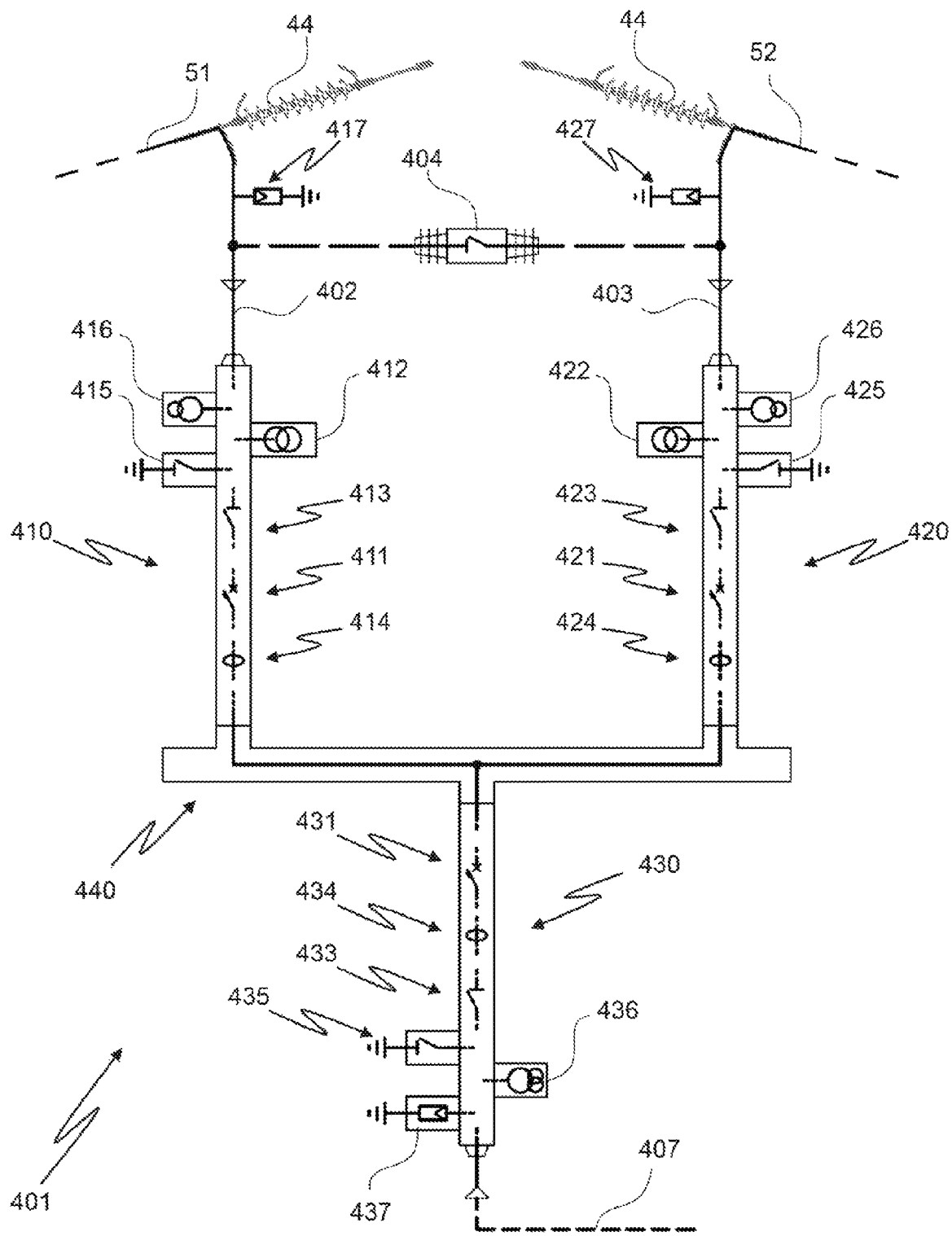
FIGS. 5A and 5B schematically illustrate two preferred embodiments of the GIS-technology-based switchgear equipment arranged within the base of the lattice tower of FIGS. 3A and 3B respectively, according to a "Y" and a "ring" shaped wiring diagram, as well as a preferred form of connection of said GIS-technology-based switchgear equipment to an HV power line and a preferred form of insertion of the bypass switching equipment.
Figure 5B:
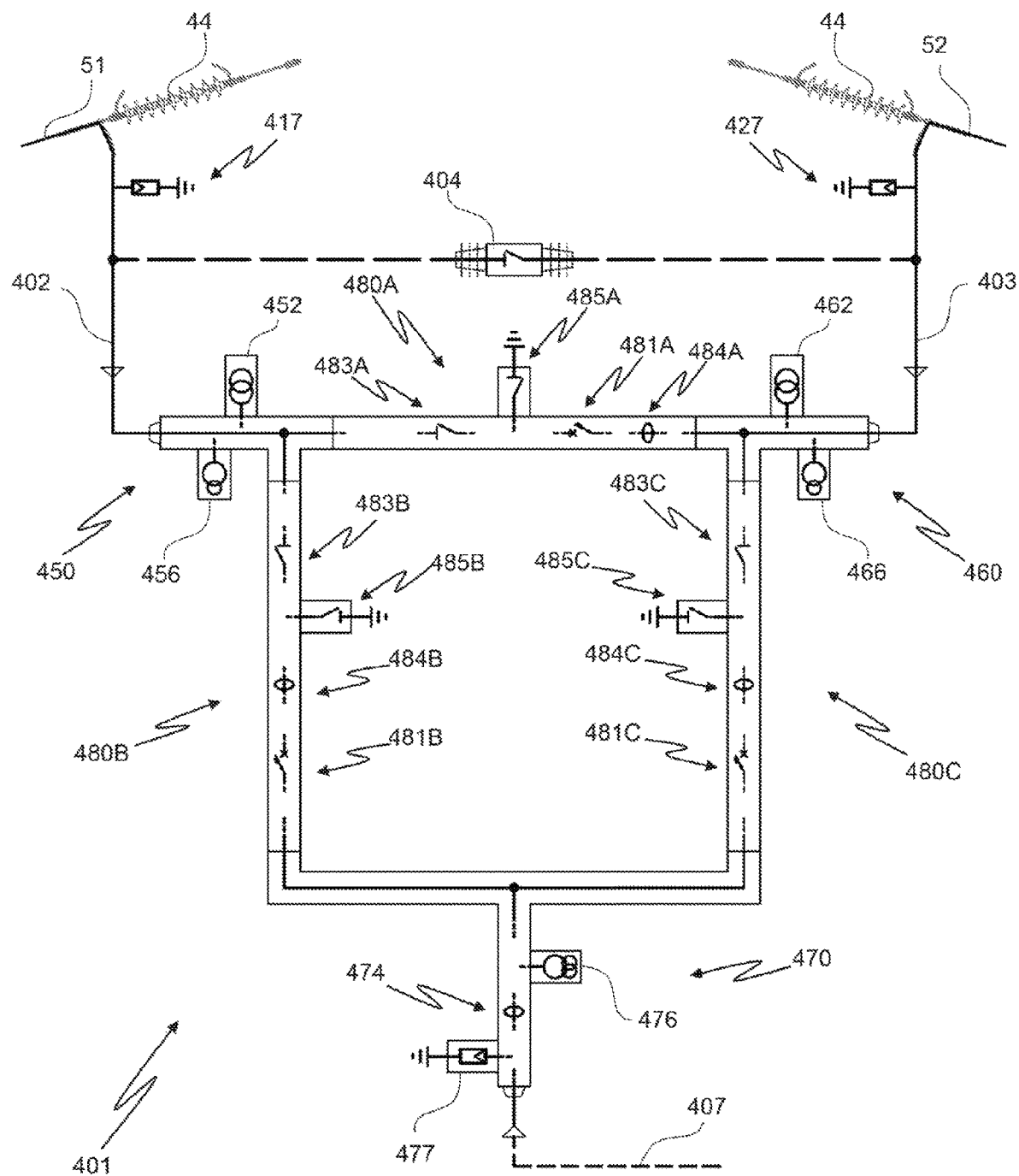

FIGS. 5A and 5B schematically illustrate (in a way that is absolutely clear to a person skilled in the art) two preferred electrical configurations (although absolutely not limiting) of embodiments of the GIS-technology-based switchgear equipment 401 based on two HV electric switching configurations, according to a "Y" and "ring" shaped wiring diagram, respectively. The same images furthermore show the interfacing of such GIS-technology-based switchgear equipment 401 with the "loop-in loop-out" feeder connections 402, 403 and with the bypass switchgear equipment 404.

As shown in FIG. 5A, in the case of a configuration with a "Y-shaped" wiring diagram, the GIS-technology-based switchgear equipment 401 comprises three bays of which:

a first bay (denoted as a whole by 410) is connected to the first "loop-in loop-out" feeder connection 402 (and, therefore, to the first conductors 51 of the HV overhead power line);

a second bay (denoted as a whole by 420) is connected to the second "loop-in loop-out" feeder connection 403 (and, therefore, to the second conductors 52 of the HV overhead power line); and a third bay (denoted as a whole by 430) is connected to the user connection line 407.

Said three bays 410, 420, 430 are connected to at least one bus bar (denoted as a whole by 440).

More specifically, the first bay 410 and the second bay 420 each include:

at least one respective circuit breaker 411, 421;

at least a respective inductive power transformer (IPT) 412, 422 for supplying, directly by the "loop-in loop-out" feeder connections 402, 403 (i.e. by the existing HV power line), low voltage loads of the grid HV electric switching substation integrated into the lattice tower 40 and, in particular, the general services (SG), the auxiliary systems (AS) of the PCCS 405, as well as the actuators of the GIS-technology switchgear equipment 401 and of the bypass switching equipment 404;

at least a respective line and/or bus bar disconnector 413, 423;

at least a respective earthing switch 415, 425, possibly also in a combined form with the line and/or bus bar disconnectors 413, 423 present in the same bay;

at least a respective current transformer (CT) 414, 424; and at least a respective voltage transformer (VT) 416, 426.

Furthermore, on the first "loop-in loop-out" feeder connection 402 a first surge arrester 417 is conveniently provided and on the second "loop-in loop-out" feeder connection 403 a second surge arrester 427 is conveniently provided.

Furthermore, the third bay 430 includes:

at least one respective circuit breaker 431;

at least a respective line and/or bus bar disconnector 433;

at least a respective earthing switch 435, possibly also in a combined form with the line and/or bus bar disconnectors 433 of the same bay;

at least a respective CT 434 and at least a respective VT 436 conveniently usable also as measurement apparatuses for performing appropriate current and voltage measurements, with tax purposes, in relation to the User connection line 407; and at least a respective surge arrester 437.

Instead, with reference to FIG. 5B, in the case of a configuration with a "ring" shaped wiring diagram, the GIS-technology-based switchgear equipment 401 preferably comprises:

a first GIS connection structure 450 which is connected to the first "loop-in loop-out" feeder connection 402 and includes at least a respective IPT 452 and a respective VT 456;

a second GIS connection structure 460 which is connected to the second "loop-in loop-out" feeder connection 403 and includes at least a respective IPT 462 and a respective VT 466, wherein said IPTs 452, 462 are conveniently used, also in this case, for obtaining the low voltage supply for the grid HV electric switching substation integrated into the lattice tower 40 and, in particular, for the GSs, the ASs of the PCCS 405, and for the actuators of the GIS-technology electric switchgear equipment 401 and of the bypass switching equipment 404;

a third GIS connection structure 470 which is connected to the user connection line 407 and includes:

at least a respective CT 474 and at least a respective VT 476 conveniently usable also as measurement apparatuses for performing appropriate current and voltage measurements, with tax purposes, in relation to the User connection line 407; and at least a respective surge arrester 477;

a first bay 480A connected between the first GIS connection structure 450 and the second GIS connection structure 460;

a second bay 480B connected between the first GIS connection structure 450 and the third GIS connection structure 470; and a third bay 480C connected between the second GIS connection structure 460 and the third GIS connection structure 470, wherein said bays 480A, 480B and 480C each include, at least a respective circuit breaker 481A, 481B and 481C, at least a respective line disconnector 483A, 483B and 483C, at least a respective earthing switch 485A, 485B and 485C, possibly also in a combined form with the line disconnectors 483A, 483B and 483C of the bay itself, and at least a respective CT 484A, 484B, 484C.

Furthermore, on the first "loop-in loop-out" feeder connection 402 a first surge arrester 417 is conveniently provided and on the second "loop-in loop-out" feeder connection 403 a second surge arrester 427 is conveniently provided.

Both solutions, as illustrated in the "Y" and "ring" shaped wiring diagrams, implement a complete "loop-in loop-out" type connection.

For greater operating flexibility, the lattice tower 40 can also be provided with bypass switching equipment 404, the use of which enables the re-closure of the HV electric backbone of the grid operator with the exclusion of the "loop-in loop-out" connection made by the compact HV electric switching substation integrated into the lattice tower 40, in order to enable the implementation of maintenance/repair operations on said HV electric switching substation. In particular, the bypass switching equipment 404 enables the HV grid backbone to be kept operational, even in the event of a fault on the GIS-technology-based switchgear equipment 401 and/or of the "loop-in loop-out" feeder connections 402, 403.

As previously described, the User's connection can be conveniently made of buried cables (in particular, in the event in which the existing HV power line is in proximity to the user demanding the connection).

Figure 6A:
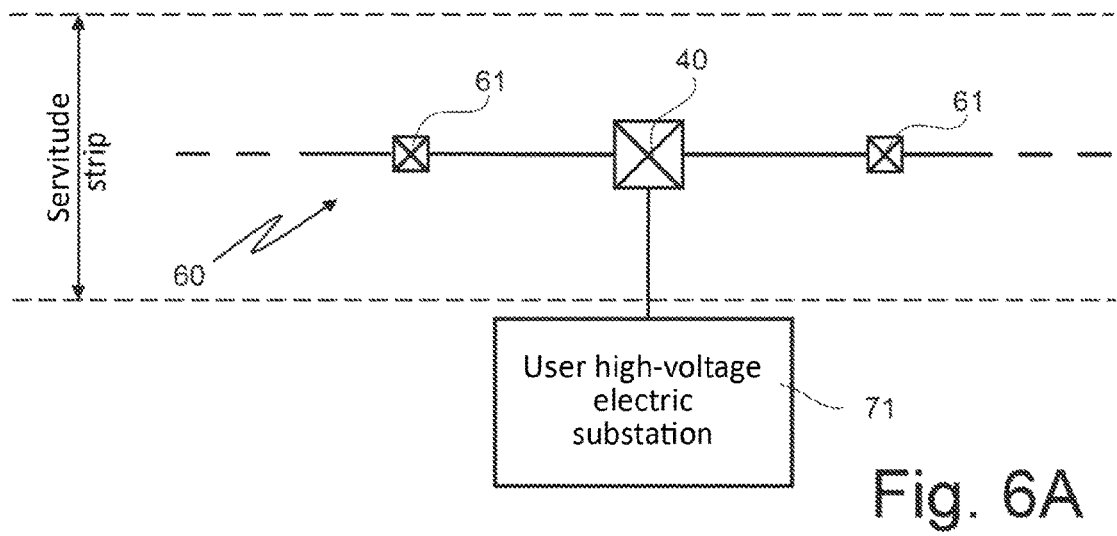
FIGS. 6A, 6B and 6C schematically illustrate examples of the use of the lattice tower of FIGS. 3A and 3B for the "loop-in loop-out" connection of user HV electric substations of different sizes to an HV grid.

FIG. 6A schematically illustrates an example of the use of the lattice tower 40 for the "loop-in loop-out" connection of an HV user to an existing HV overhead power line.

In particular, FIG. 6A illustrates a portion of an overhead transmission line 60 which, as well as traditional lattice towers 61, also comprises said lattice tower 40 to which an HV User is connected by means of a user HV electric substation 71 (e.g. a user substation for supplying an electric vehicle charging user, or an HV or High to Medium Voltage (HV/MV) transformer substation).

Figure 1A:
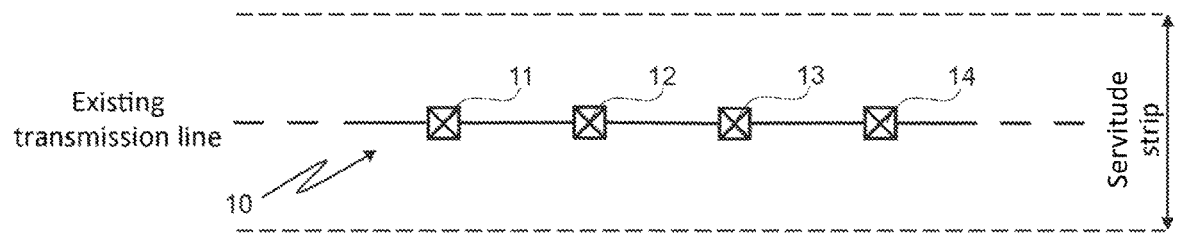
FIGS. 1A and 1B schematically illustrate a typical embodiment of a connection solution, of the "loop-in loop-out" type, to the HV grid of an operator, for the connection of an HV user.
Figure 1B:
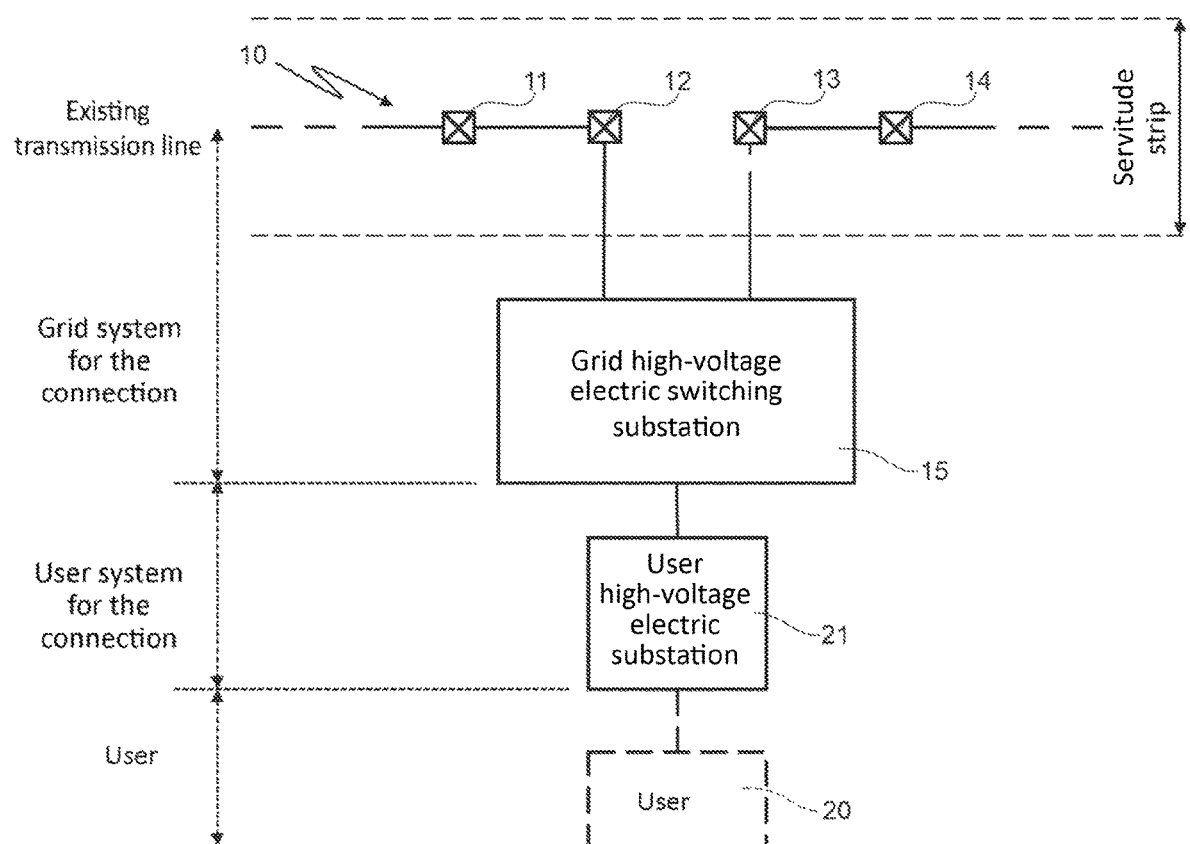

From the comparison between FIGS. 1B and 6A the advantages connected with the use of the present invention in relation to land consumption are immediately clear to a person skilled in the art. In fact, in the event in which a new user is to be connected to the HV grid (e.g. an electric vehicle charging user), thanks to the present invention it is no longer necessary to proceed with the creation of a grid HV electric switching substation of the conventional type, characterized by the occupation of a large portion of land, but is sufficient to replace a traditional lattice tower of an existing overhead transmission line with a lattice tower according to the present invention in which an extremely-compact grid HV electric switching substation (i.e. of extremely reduced dimensions) is already integrated.

More specifically, instead of dimensions of about 5400 m$^2$ of a conventional grid HV electric switching substation of the "loop-in loop-out" type with a double bus bar, or 3200 m$^2$ of a conventional grid HV electric switching substation of the "loop-in loop-out" type with a single bus bar, the lattice tower according to the present invention has base dimensions not much greater than those of a traditional lattice tower. In particular, the lattice tower according to the present invention, conveniently, has base dimensions of about 12 m×10 m=120 m$^2$.

Therefore, the solution according to the present invention intrinsically has greater sustainability in terms of better integration with the territorial context (in particular, in terms of land consumption) thus enabling a reduction in possible disputes and, therefore, speeding up the process for the authorization to construct and operate the new grid connection infrastructure, according to legal provisions in force. This is also thanks to the use of electrical structures already authorized in the past and territorial areas already occupied by assets of the HV grid operator.

Furthermore, FIG. 6A shows, by means of two broken lines, also the servitude strip of the overhead transmission line 60 (which typically, for 132-150 kV transmission lines, extends for about 15/20 m each side, to the right and left of the axis of the transmission line). More specifically, in the example of FIG. 6A, the user HV electric substation 71 is created outside the servitude strip of the overhead transmission line 60, as usually happens with currently known traditional solutions.

However, on this point, it is important also to note that the use of the lattice tower according to the present invention, into which an extremely compact HV electric switching substation is integrated, makes it possible to move closer to the axis of the existing HV line also the user HV electric substation and, if this is made according to a compact solution it would be possible to define a collocation thereof either partially or fully within the servitude strip of the overhead transmission line (so as to obtain, for the entire connection solution, better sustainability of the new infrastructure on the territory).

Figure 6B:
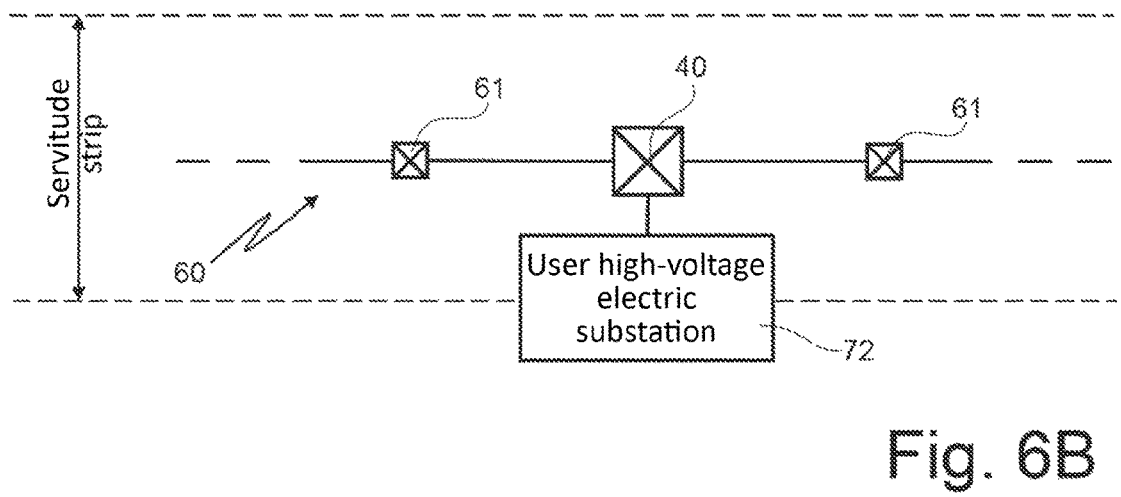
Figure 6C:
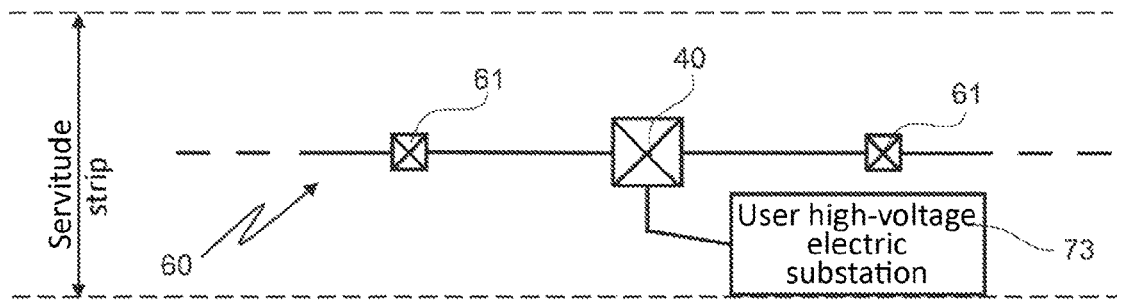

For a better understanding of what is explained above, reference should be made to FIGS. 6B and 6C, wherein:

FIG. 6B schematically illustrates an example in which a user HV electric substation 72 based on the use of compact HV equipment, with total dimensions of about 25 m×15 m=375 m$^2$, is arranged partially inside and partially outside the servitude strip of the overhead transmission line 60;

whereas FIG. 6C schematically illustrates an example in which a user HV electric substation 73 based on an ultra-compact solution, with total dimensions of about 15 m×10 m=150 m$^2$, is entirely arranged within the servitude strip of the overhead transmission line 60.

Therefore, the possibility, according to the present invention to include, in its entirety, a grid HV electric switching substation within a lattice tower 40, would also enable to implement a user HV electric substation (e.g. a user substation for supplying an electric vehicle charging user) that is compact and very close to the lattice tower 40. This translates into significant savings in terms of land consumption, definitively representing a further significant aspect of the environmental and social sustainability of the invention, which also affects a speedup of the applicable authorization procedures, given the use of land that is already occupied by existing electrical infrastructures.

Figure 7A:
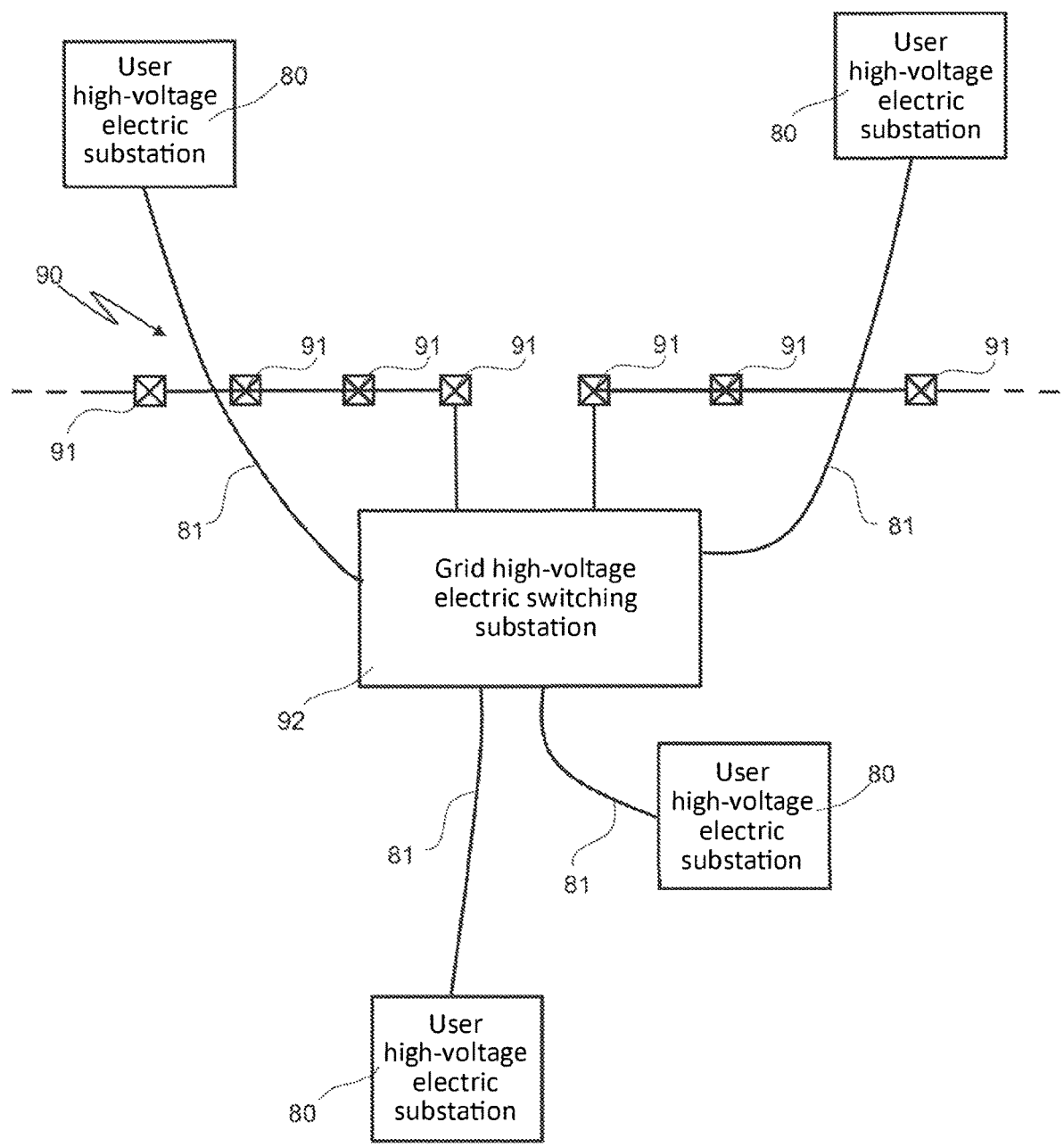
FIGS. 7A and 7B schematically illustrate the connection of different HV users to an HV grid, respectively, according to the prior art and using the lattice tower of FIGS. 3A and 3B.
Figure 7B:
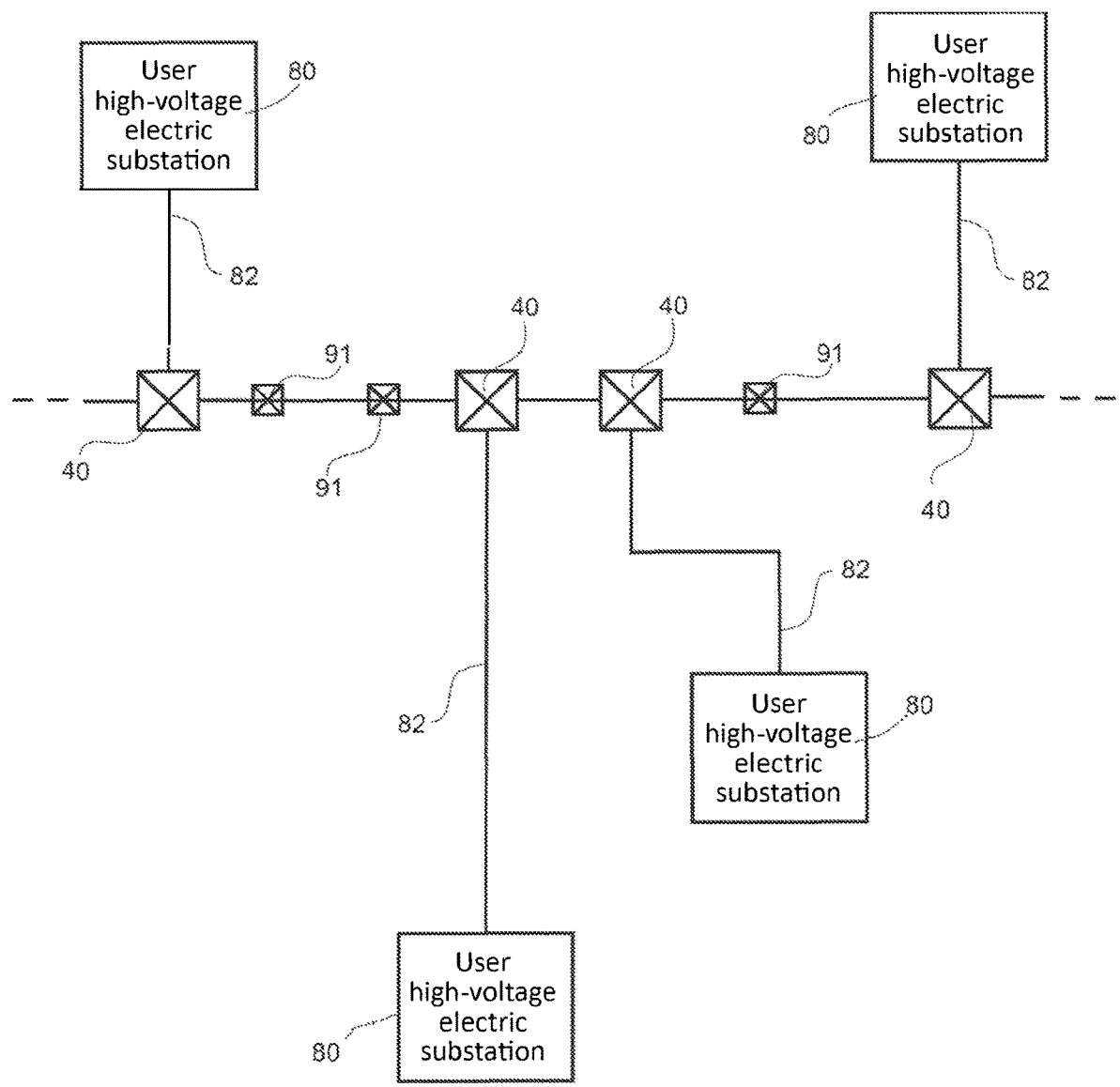

Furthermore, another advantage connected with the use of the present invention is illustrated in FIGS. 7A and 7B, wherein:

FIG. 7A schematically illustrates a typical example of the conventional connection of different user HV electric substations 80 to an existing overhead transmission line 90 (comprising a plurality of traditional lattice towers 91) through a single HV electric switching substation 92 of the "loop-in loop-out" type; wherein, following the conventional connection mode, it is necessary to implement single HV electrical connections (indicated by 81) from the grid HV electric switching substation 92 to every single user HV electric substation 80, with a high land occupation/consumption for the creation of such connections 81;

whereas FIG. 7B schematically illustrates an example of the advantageous use of the present invention, in which some traditional lattices 91 have been replaced with the lattice supports 40 and every user HV electric substation 80 is connected to a respective lattice tower 40 (the user connection lines to the HV grid being indicated, in this case, with 82), with a consequent generally more rational and reduced consumption of land.

Furthermore, it is important to note also how the choice to supply the low voltage loads of the compact grid HV electric switching substation integrated into the lattice tower 40 (specifically, the GSs, the ASs of the PCCS 405 and the actuators of the GIS-technology switchgear electric equipment 401 and of the bypass switching equipment 404) through the use of IPTs 412, 422/452, 462, makes the solution more resilient towards severe climatic events. In fact, the power is taken from an infrastructure with a higher degree of electrical and mechanical reliability, in terms of resilience to ice and snow, with respect to usual Medium Voltage (MV) distribution lines, with which the ASs of the electric substations are typically powered and that suffer more greatly from the climatic problems of the territory that they cross.

Furthermore, such a technical solution makes it possible to avoid the construction of new MV and Low Voltage (LV) overhead lines for supplying the low voltage loads of the new electric stations, with clear advantages in terms of:

social and environmental sustainability;
less land occupation;
protection of the vegetation present and conservation of the surrounding habitats, especially in woody areas.

Furthermore, it is also important to note that current solutions based on "Air-Insulated Substation" (AIS) technology, with air-insulated switchgear equipment, can have large difficulties in snowy and icy conditions, with potential switching problems and consequent operating limitations of the electric system.

On the other hand, the present invention exploits GIS technology, i.e. switchgear equipment electrically insulated in a gaseous fluid and enclosed in closed compartments which is, therefore, protected against snow and ice.

Furthermore, also the mechanical control parts (i.e. rods, levers, etc.) are contained within the aforesaid casings and, therefore, protected against snow and ice.

The solution according to the present invention is, therefore, extremely resilient also with respect to severe climatic conditions and, therefore, can also be installed in sites marked by extreme climatic and/or weather situations.

In order to validate the present invention, the Applicant has performed an in-depth reliability study applying a probabilistic analysis method based on operating data known in the literature ("*Failure Frequencies for High-Voltage Circuit Breakers, Disconnectors, Earthing Switches, Instrument Transformers, and Gas-Insulated Switchgear*", IEEE Transactions On Power Delivery, Vol. 28, No. 1, January 2013). Therefore, a first comparative table is presented herein below (named "Table A") showing a comparison between GIS and AIS technologies in terms of reliability, hypothesizing the use of such technologies for the creation of the grid HV electric switching substation integrated into the lattice tower according to the present invention. In particular, the use of an HV electric switching configuration according to the "Y" shaped wiring diagram with a single bus bar has been hypothesized, with the co-presence of the switching equipment having a bypass function (FIG. 5A).

TABLE A

| Technology | Power interruption of the User | Interruption of the HV grid backbone |
|---|---|---|
| GIS | 239 years (0.42 × 10$^{-2}$ breakdowns/year) | 662 years (0.15 × 10$^{-2}$ breakdowns/year) |
| AIS | 52 years (1.91 × 10$^{-2}$ breakdowns/year) | 118 years (0.85 × 10$^{-2}$ breakdowns/year) |

Table A clearly shows the advantages in terms of reliability of GIS technology with respect to traditional AIS technology.

Furthermore, the Applicant has also performed a comparative analysis between HV electric switching configurations according to "Y" shaped wiring diagrams with a single bus bar with bypass (FIG. 5A) and "ring" shaped wiring diagrams with bypass (FIG. 5B), in the event of using GIS technology. On this point, a second comparative table is shown below (called "Table B") showing the results of such analysis.

TABLE B

| Technology | Power interruption of the User | Interruption of the HV grid backbone |
|---|---|---|
| "Y"-shaped diagram | 239 years (0.42 × 10$^{-2}$ breakdowns/year) | 662 years (0.15 × 10$^{-2}$ breakdowns/year) |
| "Ring"-shaped diagram | 206 years (0.21 × 10$^{-2}$ breakdowns/year) | 680 years (0.15 × 10$^{-2}$ breakdowns/year) |

As can be deduced from Table B, in terms of reliability, the use of the two wiring diagrams is substantially equivalent with the particular feature that, the use of the "Y" shaped wiring configuration, in GIS technology, is slightly more advantageous for reducing the risk of the power interruption of the HV User whereas the use of a configuration with a "Ring" shaped diagram, in GIS technology, is slightly more advantageous for containing the risk of the interruption of the HV grid backbone.

Instead, in relation to the comparison between the lattice tower according to the present invention and traditional "delta-shaped" towers, it is important to note that:

the top portion 43 of the lattice tower 40 has comparable dimensions to those of the top portion of traditional "delta-shaped" towers;

with the same equivalent height (i.e. equivalent height of the conductors from the ground), the lattice tower and the traditional "delta-shaped" towers have practically the same total height;

the base 41 of the lattice tower 40 has larger dimensions, having to house, within it, the GIS technology switchgear equipment 401.

However, it is to be considered that the use of traditional solutions would require, for the connection of a new User, also the creation of a grid HV electric switching substation of the conventional type which, considering the dimensions previously described, would cause increased land use compared to the land occupation required by a tower according to the present invention.

In relation to the comparison between the lattice tower according to the present invention and traditional "triangular configuration" towers, it is important to note that:
- the top portion 43 of the lattice tower 40 has larger dimensions than those of the top portion of the traditional "triangular configuration" towers;
- with an equivalent useful height the traditional "triangular configuration" towers have a total height that is greater than that of the lattice tower 40;
- the base 41 of the lattice tower 40 has larger dimensions, having to house the GIS technology switchgear equipment 401.

However, also in this case, on the basis of a total evaluation that must also consider the dimensions required for creating a grid HV electric switching substation of the conventional type, the use of the present invention is more advantageous overall.

Furthermore, the lattice tower 40 was appropriately designed so as to guarantee electric and magnetic fields that are comparable with those produced by the HV line in its original configuration. In fact, for the top portion 43 of the lattice tower 40, a "delta-shaped" diagram was defined in which, at the lattice beam of the top hamper and annexed brackets, different possible mechanical attachment points for the conductors of the HV overhead line were especially designed, as illustrated schematically in FIGS. 8A, 8B and 8C.

Figure 8A:
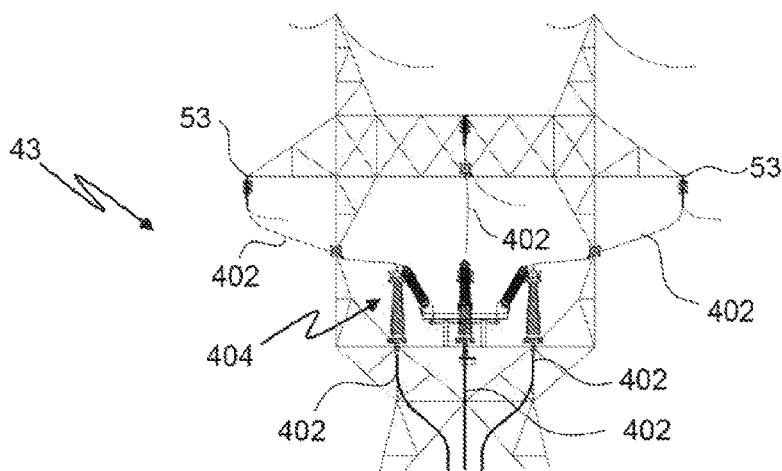
FIGS. 8A, 8B and 8C schematically illustrate different configurations of the top hamper usable for the "delta-shaped" lattice tower of FIGS. 3A and 3B, according to three preferred embodiments of the present invention, in which a first configuration envisages that the external conductors of the HV power line are anchored at the tip of the crossarms of the tower, a second configuration envisages that the external conductors are anchored at the attachment of the crossarms to the body of the tower, and a third configuration envisages that said external conductors are anchored to the body of the tower, without crossarms.
Figure 8B:
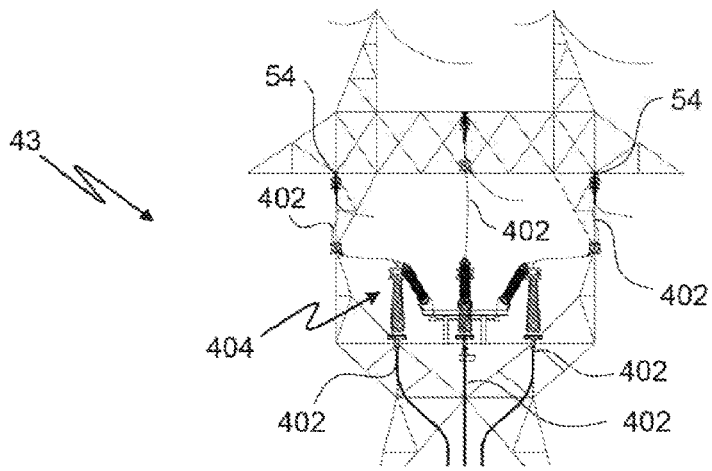
Figure 8C:
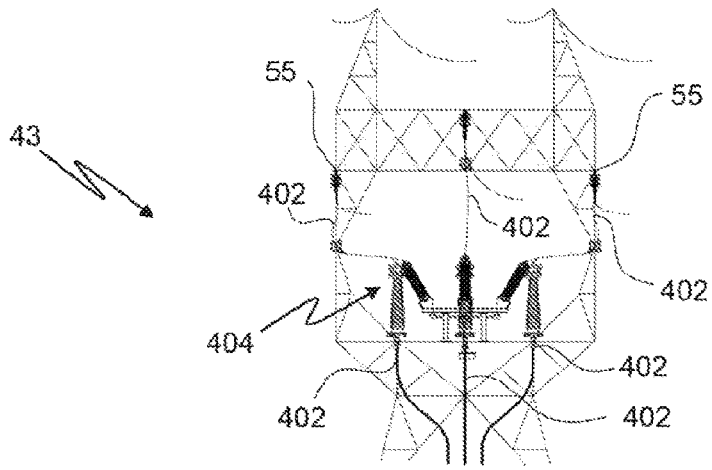

In particular, the "delta-shaped" tower was conveniently designed to guarantee the following alternative configurations:
- the anchoring of the lateral phases of the HV overhead line to the tip 53 of the tower crossarms, as schematically illustrated in FIG. 8A;
- the anchoring of the lateral phases of the HV overhead line to the tower body, at the attachment of the crossarms of the tower to the lattice beam of the "top hamper", as schematically illustrated in FIG. 8B (in which the anchoring points are indicated with 54); and
- the anchoring of the lateral phases of the HV overhead line to the tower body, at the lattice beam of the "top hamper", with total removal of the tower crossarms, to the benefit of less visual interaction with the territory, as schematically illustrated in FIG. 8C (wherein the anchoring points are indicated with 55).

Figure 9A:
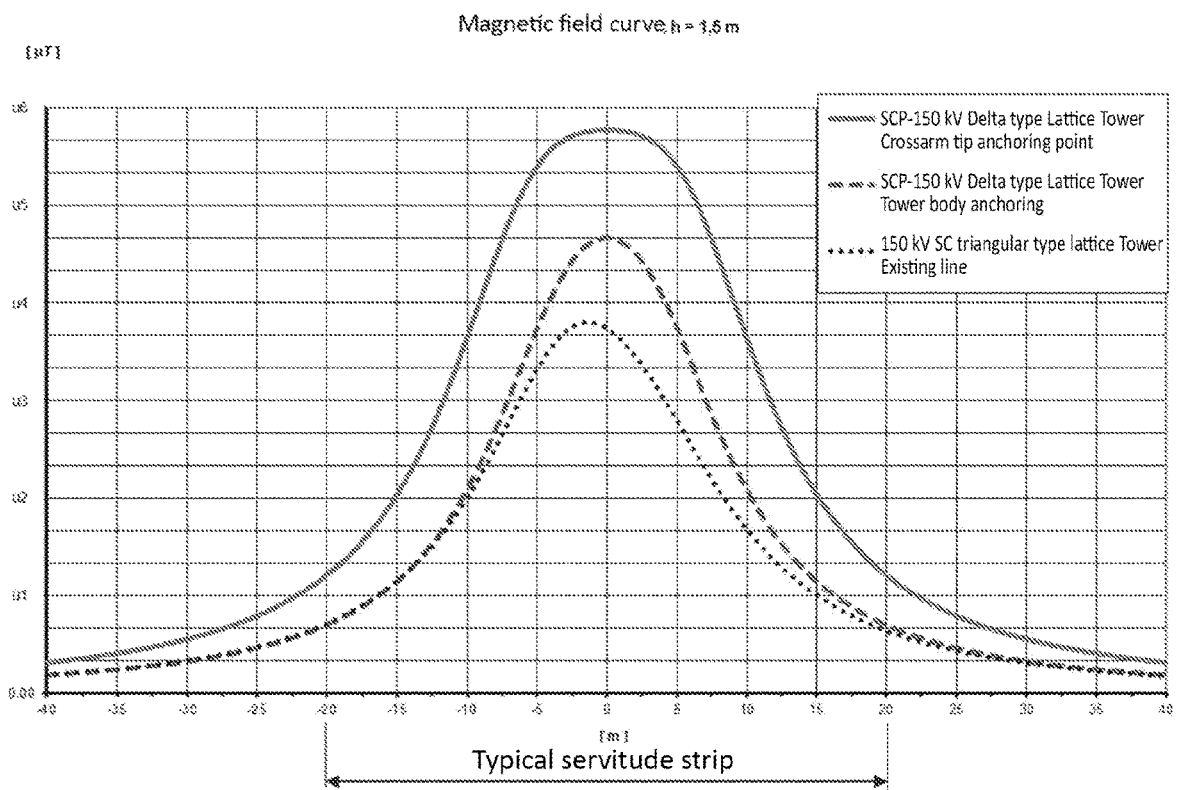
FIGS. 9A and 9B show magnetic field and electric field curves, respectively, related to the lattice tower of FIGS. 3A and 3B and to lattices of the known type.
Figure 9B:
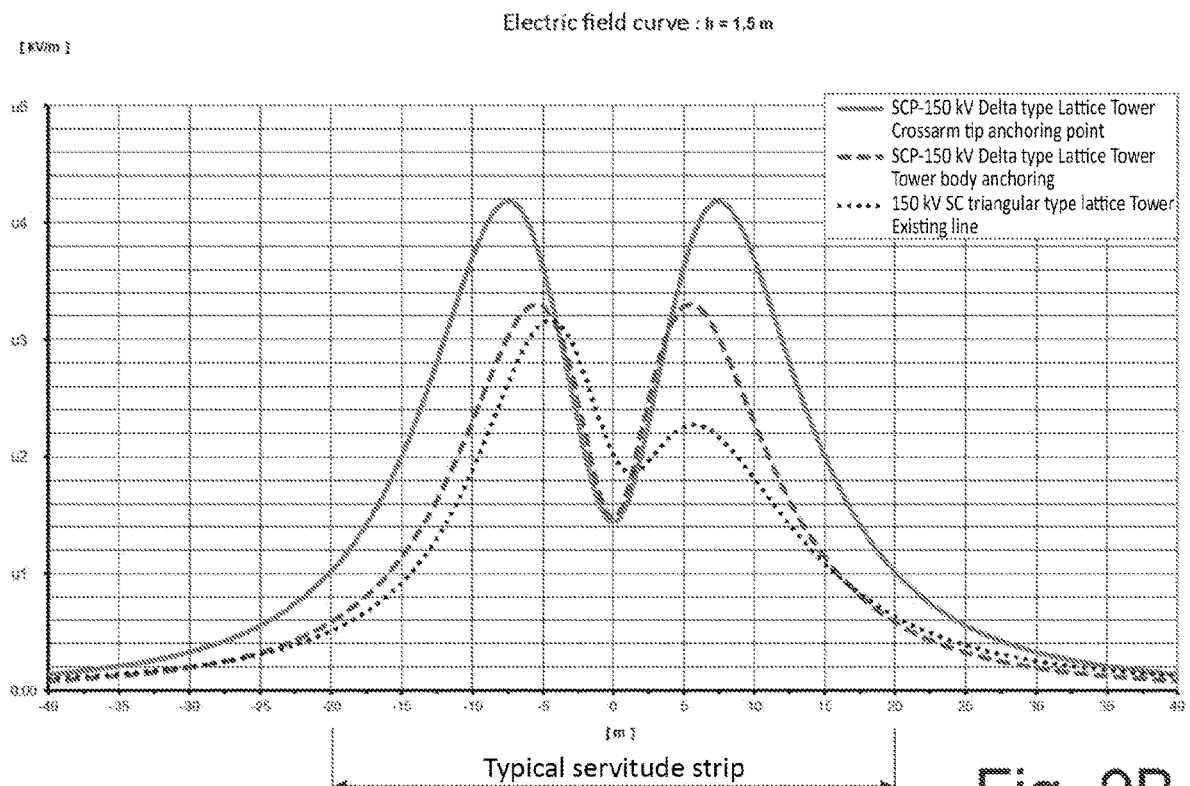

This enables the most suitable anchoring point to be chosen for anchoring the conductors to the tower, on the basis of the local anthropic intervention situation, in order to optimize (specifically, minimize) the electric and magnetic fields generated. In particular, the solution with lateral phases of the HV overhead line anchored at the tip 53 of the tower crossarms is the most resilient and, therefore, preferred for installations in remote areas, also marked by extreme climatic and/or weather situations. The configurations with anchoring of the lateral phases of the HV overhead line at the lattice beam of the top hamper (anchoring points 54, 55), on the other hand, are more appropriately installable in anthropized areas, as the mutual nearing of the conductors enables both the magnetic field and the electric field generated by the transmission line to be significantly reduced. The result of the geometry used and the relative distance between the phases adopted in the configurations with anchoring of the lateral phases of the HV overhead line to the tower body, in fact, determines electric and magnetic field values that are comparable with those generated by traditional HV lattice towers, in particular at the outer areas of the servitude strips of the transmission line (typically, 15-20 m per part from the line axis, for 132-150 kV transmission lines), as shown in the graphs of FIGS. 9A and 9B which represent magnetic field curves and electric field curves, respectively, related to lattice towers according to the present invention and traditional "triangular configuration" towers (wherein the acronym SCP—Compact Switching on Pole—means the lattice tower according to the present invention).

Such peculiarity provides the solution according to the present invention with a very high application index on the territory, also in situations marked by significant anthropic development.

In order to guarantee harmonious insertion into the local context, the base 41 and the body 42 of the lattice tower 40 were designed to be conveniently covered by structures designed to camouflage, cover or conceal from view both the lattice structure, and the components of the grid HV electric switching substation integrated therein, e.g. through the placement of mimetic structures based on the study of the colour scheme of the relative backdrop, or reflecting structures.

From the present description, the innovative characteristics and numerous technical advantages of the present invention are immediately clear to a person skilled in the art.

On this point, it is important to underline the fact that the present invention enables a "loop-in loop-out" connection of a user substation to an HV overhead electric line to be created with extremely reduced times and dimensions with respect to currently known solutions.

Furthermore, it is important also to draw attention to the fact that the solution according to the present invention:
- provides an appropriate response to potential rapid growth in demand for connection to the HV grid by new HV users, guaranteeing certain implementation times for the various connections;
- is respectful of the connection rules for guaranteeing operating reliability and security for the electric system;
- is sustainable from the environmental insertion point of view; and
- enables the times for the authorization for the construction and operation of the HV connection electrical infrastructures to be reduced.

Furthermore, it is also important to focus on the fact that the solution according to the present invention differs from that according to JP S58 22806 U in that the GIS-technology-based switchgear equipment 401 is arranged within the base 41 of the lattice tower 40, therefore, the land occupation of the grid HV electric switching substation is reduced to the sole surface area of the base 41 of the lattice tower 40, with the "loop-in loop-out" feeder connections 402, 403 arranged within the volume of said lattice tower 40.

The solution, according to JP 551 38419 B1 also implies greater land consumption with respect to the present invention. In fact, in the solution according to JP 551 38419 B1, GIS equipment is used which, although arranged below a lattice tower, has dimensions that exceed those of the base of the lattice tower in order to ensure the necessary electrical insulation clearances between the tower and the bare conductors that connect said GIS equipment to the overhead power line. Furthermore, said connection conductors extend well beyond the volume of the lattice tower and require the use of supporting surge arresters installed outside the lattice.

Instead, in relation to the solution according to RU 2 420 846 C1, the focus is on the fact that such solution relates to an HV/LV transformer electric substation not based on GIS technology, i.e. a completely different technical solution with respect to the present invention.

Finally, it is important to note that the present invention also enables to completely overcome the technical disadvantages previously described in relation to the use of the solution according to WO 2019/123424 A1 for supplying charging stations for electric vehicles through the tapping from the conductors of a span of a High-Voltage (HV) or Extra-High Voltage (EHV) three-phase overhead power line.

In fact, unlike the solution according to WO 2019/123424 A1, the present invention does not envisage the rigid tapping of a span of an HV overhead electric line, rather the connection to said line of a "loop-in loop-out" user charging station for electric vehicles (i.e. a charging user), by means of a compact electric switching substation integrated into a lattice tower of an HV overhead transmission line.

In particular, the "loop-in loop-out" connection mode, together with the GIS-technology switchgear equipment and the protection, command and control system (PCCS) present in the compact grid HV electric switching substation integrated into the lattice tower for HV overhead transmission lines according to the present invention enables:

1) the power interruption of the sole line sections bordering the compact substation for maintenance, without power interruption of the charging user or of the entire HV backbone;
2) the implementation of maintenance interventions on line sections bordering the compact substation, without the need to resort to "live-line work" to guarantee the power supply to the charging user, the remaining sections of the HV line and the HV users connected thereto;
3) the automatic identification and selective extinction of faults on line sections bordering the compact substation without the power interruption of the charging user;
4) the automatic identification and selective extinction of faults on the connection tap of the charging user to the HV overhead line, without power interruption of the HV backbone and, therefore, of the users connected thereto;
5) the connection to the HV overhead line and the disconnection therefrom of the charging user without power interruptions of the HV backbone and, therefore, of the users connected thereto.

This is possible as the charging user is configured as one of the many users that the compact grid HV electric switching substation integrated into the lattice tower for HV overhead transmission lines according to the present invention enables to be "loop-in loop-out" connected to an HV electric line.

In conclusion, it is important to note that, although the invention described above makes particular reference to very precise embodiments, it cannot be considered limited to such embodiments, as all variants, modifications or simplifications covered by the appended claims fall within the scope thereof.

The invention claimed is:

1. A lattice tower (40) for a high-voltage overhead transmission line (60, 90), the lattice tower (40) having a lattice structure comprising:
   a base (41) anchored to a ground;
   a top portion (43) designed for anchoring first conductors (51) and second conductors (52) of the high-voltage overhead transmission line; and
   a body (42) which extends between the base (41) and the top portion (43);
   wherein
   a lattice tower comprises a grid high-voltage electric switching substation that includes: GIS-technology-based switchgear equipment (401);
   a first loop-in loop-out feeder connection (402) that is configured to connect the first conductors (51) of the high-voltage overhead transmission line to the GIS-technology-based switchgear equipment (401), and made by insulated cables or GIS-technology-based ducts, or by mixed solutions wherein a first portion is made by bare conductors and a second portion is made by the insulated cables or the GIS-technology-based ducts;
   a second loop-in loop-out feeder connection (403) that is configured to connect the second conductors (52) of the high-voltage overhead transmission line to the GIS-technology-based switchgear equipment (401), and made by insulated cables or GIS-technology-based ducts, or by mixed solutions wherein a first portion is made by bare conductors and a second portion is made by the insulated cables or the GIS-technology-based ducts; and
   a protection, command and control system (405) arranged within the lattice structure (40), or in proximity to the base (41) of said lattice structure;
   wherein the GIS-technology-based switchgear equipment (401) is designed to be connected also to a user connection line (407);
   characterized in that the GIS-technology-based switchgear equipment (401) is arranged within the base (41) of the lattice structure.

2. The lattice tower of claim 1, wherein the GIS-technology-based switchgear equipment (401) has a configuration with a Y-shaped wiring diagram and comprises:
   a first switchgear bay (410) connected to the first loop-in loop-out feeder connection (402);
   a second switchgear bay (420) connected to the second loop-in loop-out feeder connection (403); and
   a third switchgear bay (430) designed to be connected to the user connection line (407);
   wherein said first (410), second (420) and third (430) switchgear bays are connected to each other via one or more busbars (440).

3. The lattice tower of claim 2, wherein each of said first (410) and second (420) switchgear bays comprise a respective inductive power transformer (412, 422) for providing low-voltage power supply to loads of the grid high-voltage electric switching substation and to the protection, command and control system (405); and
   wherein said third switchgear bay (430) comprises measuring equipment for carrying out current and voltage measurements related to the user connection line (407), wherein said measuring equipment includes at least a current transformer (434) and at least a voltage transformer (436).

4. The lattice tower of claim 1, wherein the GIS-technology-based switchgear equipment (401) has a configuration with a ring-shaped wiring diagram and comprises:
   a first GIS connection structure (450) connected to the first loop-in loop-out feeder connection (402);
   a second GIS connection structure (460) connected to the second loop-in loop-out feeder connection (403);
   a third GIS connection structure (470) designed to be connected to the user connection line (407);
   a first switchgear bay (480A) connected between the first GIS connection structure (450) and the second GIS connection structure (460);

a second switchgear bay (480B) connected between the first GIS connection structure (450) and the third GIS connection structure (470); and a third switchgear bay (480C) connected between the second GIS connection structure (460) and the third GIS connection structure (470).

5. The lattice tower of claim 4, wherein each of the first (450) and second (460) GIS connection structures comprise a respective inductive power transformer (452, 462) for providing low-voltage power supply to loads of the grid high-voltage electric switching substation and to the protection, command and control system (405); and wherein the third GIS connection structure (470) comprises measuring equipment for carrying out current and voltage measurements related to the user connection line (407), wherein said measuring equipment includes at least a current transformer (474) and at least a voltage transformer (476).

6. The lattice tower according to claim 1, wherein the lattice structure further includes bypass switching equipment (404) that is:

connected between the first and second loop-in loop-out feeder connections (402, 403);

configured to keep, by default, said first and second loop-in loop-out feeder connections (402, 403) disconnected from one another, so as to maintain a loop-in loop-out connection between the first conductors (51) and the second conductors (52) of the high-voltage overhead transmission line through the GIS-technology-based switchgear equipment (401); and operable, when necessary, to directly connect said first and second loop-in loop-out feeder connections (402, 403) so as to achieve a direct connection between the first conductors (51) and the second conductors (52) of the high-voltage overhead transmission line, bypassing the GIS-technology-based switchgear equipment (401).

7. The lattice tower according to claim 1, wherein the top portion (43) of the lattice structure is designed for anchoring:

the first conductors (51) of the high-voltage overhead transmission line at a front part of said lattice structure; and the second conductors (52) of the high-voltage overhead transmission line at a rear part of said lattice structure;

wherein the first loop-in loop-out feeder connection (402) extends from the top portion (43) to the base (41) of the lattice structure along the front part of said lattice structure;

wherein the second loop-in loop-out feeder connection (403) extends from the top portion (43) to the base (41) of the lattice structure along the rear part of the lattice structure;

and wherein the user connection line (407) is connected to the GIS-technology-based switchgear equipment (401) at a side part of the lattice structure.

8. The lattice tower according to claim 1, wherein the top portion (43) of the lattice structure is of the delta type and is provided with different alternative anchoring points (53, 54, 55) for external portions of the first conductors (51) and the second conductors (52) of the high-voltage overhead transmission line.

9. The lattice tower according to claim 1, wherein the GIS-technology-based switchgear equipment (401) is extractably housed within the base (41) of the lattice structure; and wherein the protection, command and control system (405) is housed in one or more shelters (406) arranged within the base (41) of the lattice structure in a raised position (45) with respect to the GIS-technology-based switchgear equipment (401).

10. The lattice tower of claim 9, wherein the GIS-technology-based switchgear equipment (401) is mounted on constrained-guide extraction systems.

11. A method for connecting a user high-voltage electric substation (71, 72, 73, 80) to a high-voltage overhead transmission line (60, 90), comprising:

replacing an in-use lattice tower (61, 91) of the high-voltage overhead transmission line (60, 90) with the lattice tower (40) as claimed in claim 1; and connecting the user high-voltage electric substation (71, 72, 73, 80) to said lattice tower (40) as claimed in claim 1.

12. The method of claim 11, wherein the user high-voltage electric substation (71, 72, 73, 80) is connected to the GIS-technology-based switchgear equipment (401) through a buried cable line (407).

13. The method according to claim 11, wherein the user high-voltage electric substation (71, 72, 73, 80) is arranged partially or entirely within a servitude strip of the high-voltage overhead transmission line (60).

14. The method according to claim 11, wherein the user high-voltage electric substation (71, 72, 73, 80) is a user substation for supplying an electric vehicle charging user.

15. A group for charging an electric vehicle, comprising:

the lattice tower (40) as claimed in claim 1; and a user substation (71, 72, 73, 80) for supplying a user charging the electric vehicle connected to the GIS-technology-based switchgear equipment (401) through the user connection line (407).

16. A use of the lattice tower (40) as claimed in claim 1 for connecting a user substation (71, 72, 73, 80) for supplying an electric vehicle charging user to the high-voltage overhead electric line (60, 90).

* * * * *